(12) United States Patent  (10) Patent No.: US 7,646,916 B2
O'Hara et al.  (45) Date of Patent: Jan. 12, 2010

(54) LINEAR ANALYST

(75) Inventors: Charles G. O'Hara, Columbus, MS (US); Suyoung Seo, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 11/279,831

(22) Filed: Apr. 14, 2006

(65) Prior Publication Data

US 2007/0009156 A1 Jan. 11, 2007

Related U.S. Application Data

(60) Provisional application No. 60/671,519, filed on Apr. 15, 2005.

(51) Int. Cl.
*G06K 9/46* (2006.01)
*G06K 9/62* (2006.01)
*G06K 9/64* (2006.01)
*G06K 9/68* (2006.01)

(52) U.S. Cl. .................. 382/190; 382/209; 382/217

(58) Field of Classification Search .............. 382/113, 382/190, 214, 173, 286, 192, 193, 194, 195, 382/197, 199, 201, 203, 204, 209, 217–219
See application file for complete search history.

(56) References Cited

U.S. PATENT DOCUMENTS

| 5,604,596 | A | * | 2/1997 | Ukai et al. ............. 358/296 |
|---|---|---|---|---|
| 5,878,392 | A | * | 3/1999 | Meyer et al. ............ 704/234 |
| 5,987,173 | A | * | 11/1999 | Kohno et al. ............ 382/199 |
| 6,128,410 | A | * | 10/2000 | Park et al. .............. 382/218 |
| 6,763,137 | B1 | * | 7/2004 | Krtolica ................. 382/204 |
| 7,224,823 | B2 | * | 5/2007 | Hayata et al. ........... 382/118 |
| 2002/0050924 | A1 | * | 5/2002 | Mahbub ................. 340/426 |
| 2002/0133499 | A1 | * | 9/2002 | Ward et al. ............. 707/102 |
| 2004/0022432 | A1 | * | 2/2004 | Hayata et al. ........... 382/159 |
| 2006/0041375 | A1 | * | 2/2006 | Witmer et al. .......... 701/208 |
| 2006/0050933 | A1 | * | 3/2006 | Adam et al. ............ 382/118 |
| 2008/0180535 | A1 | * | 7/2008 | Habuka et al. ......... 348/208.4 |

OTHER PUBLICATIONS

Fortier, M.F., et al., "Survey of Work on Road Extraction in Aerial and Satellite Images," DMI, Universite de Sherbrooke, Technical Report N., 247, (2000).

Heipke, C., et al., "Evaluation of Automatic Road Extraction," International Archives of Photogrammetry and Remote Sensing, International Society for Photogrammetry and Remote Sensing, 32(3-2W3): 47-56, (1997).

Hinz, S., et al., "A Scheme for Road Extraction in Rural Areas and its Evaluation," Applications of Computer Vision, Fifth IEEE Workshop, 134-139, (2000).

Wiedemann, C., et al., "Automatic Extraction and Evaluation of Road Networks from Satellite Imagery," IAPRS, 32 (3-2W5): 95-100, (1999).

(Continued)

*Primary Examiner*—Aaron W Carter
(74) *Attorney, Agent, or Firm*—Lawrence Arthur Schemmel

(57) ABSTRACT

A system and method for feature evaluation that include an evaluation system configured to consider extracted features and reference features and an evaluation system configured to quantify accuracy, quality, and correspondence between the reference features and the extracted features.

42 Claims, 17 Drawing Sheets

OTHER PUBLICATIONS

Seo, S., et al., "A Toolkit for Quantifying Linear Feature Extraction Performance," ASPRS Conference 2004 Proceedings, (May 27, 2004).

Aviad, Z., et al., "Road Finding for Road-Network Extraction," Computer Vision and Pattern Recognition, 814-819, (1988).

Bückner, J., "Model Based Road Extraction for the Registration and Interpretation of Remote Sensing Data," ISPRS Commission IV Symposium on 'GIS—Between Visions and Applications,' (1998).

Keaton, T., et al., "A Level Set Method for the Extraction of Roads from Multispectral Imagery," Applied Imagery Pattern Recognition Workshop, 31:141-147, (2002).

Mayer, H., et al., "Automatic Road Extraction Based on Multi-Scale Modeling, Context, and Snakes," Int. Arch. of Photogramm. and Remote Sensing, 32(3-2W3):106-113, (1997).

Monga, O., et al., "Thin Nets and Crest Lines: Application to Satellite Data and Medical Images," IEEE Proceedings, Image Processing, International Conference, 2:468-471, (1995).

Oddo, L., et al., "Automated Road Extraction Via the Hybridization of Self-Organization and Model Based Techniques," IEEE Applied Imagery Pattern Recognition Workshop Proceedings, 29:32-38, (2000).

Steger, C., "An Unbiased Detector of Curvilinear Structures," IEEE Transactions on Pattern Analysis and Machine Intelligence, 20(2):113-125, (1998).

Steger, C., et al., "The Role of Grouping for Road Extraction," Automatic Extraction of Man-Made Objects from Aerial and Space Image (II), 245-256, (1997).

Tesser, H., et al., "RoadFinder Front End: An Automated Road Extraction System," Pattern Recognition 2000, 1:338-341, (2000).

Tupin, F., et al., "Road Detection in Dense Urban Areas Using SAR Imagery and the Usefulness of Multiple Views," IEEE Trans. on Geoscience and Remote Sensing, 40(11):2405-2414, (2002).

* cited by examiner

LINEAR ANALYST

CROSS-REFERENCE TO RELATED APPLICATIONS

The present application claims priority to provisional patent application Ser. No. 60/671,519 filed on Apr. 15, 2005, the entire contents of which are incorporated herein by reference.

STATEMENT AS TO RIGHTS TO INVENTIONS MADE UNDER FEDERALLY SPONSORED RESEARCH AND DEVELOPMENT

The present invention was made with Government support under SBAHQ-03-1-0023 awarded by the U.S. Small Business Administration. The government may have certain rights in the invention.

FIELD

The present invention relates generally to image sensing and image treatment methods and systems and more particularly to linear correspondence assessment or linear analysis of features.

BRIEF SUMMARY

The feature evaluation system includes a system configured to consider extracted features that comprise at least one input test vector data set and reference features that comprise at least one reference vector data set and an evaluation system configured to quantify accuracy, quality, and correspondence between the reference features and the extracted features.

A method for evaluating features includes evaluating extracted features that comprise at least one input test vector data set and quantifying accuracy, quality, and correspondence between predefined reference features and the extracted features. For the invention, features are defined as and are synonymous with data as well as datasets.

A method of rasterizing and buffering includes rasterizing by drawing input vector lines in an existence layer with values 0 for negative pixels and 1 for positive pixels and recording a length of the vector lines in a length layer for the positive pixels, and buffering by generating a buffer area around a line segment. The method further includes computing a distance and an orientation at pixels within the buffer area.

Yet another aspect of the present invention is to provide a method of assessing linear correspondence. The method includes setting an image frame so that the image frame is configured by a map extent of an overlapping area of an input evaluation dataset and an input reference dataset, by a cell size of the image, and by offsets of the evaluation dataset, generating an existence raster layer, a length raster layer, a distance raster layer and an orientation raster layer from each dataset using rasterizing by drawing input vector lines in an existence layer with values 0 for negative and 1 for positive and recording a length of the vector lines in a length layer, and using buffering by generating a buffer area around a line segment and computing a distance and an orientation at pixels within the buffer area and assigning the distance and orientation to the distance and orientation layers. The method further includes performing matching in two directions, one direction being from reference to evaluation and the other direction being from evaluation to reference. The matching in the reference to evaluation direction uses the existence layer and the length layer from the evaluation dataset, and the matching in the evaluation to reference direction uses the distance layer and the orientation layer.

DESCRIPTION OF EMBODIMENTS

During the last decades, remotely sensed imagery has been used extensively to obtain spatial information over earth surfaces. For example, one application of remote sensing is road extraction. Road extraction is sought after because roads play an important role in human activities. To automatically update road features, feature evaluation may be needed for accurate and consistent updates of roads.

Figure 1:
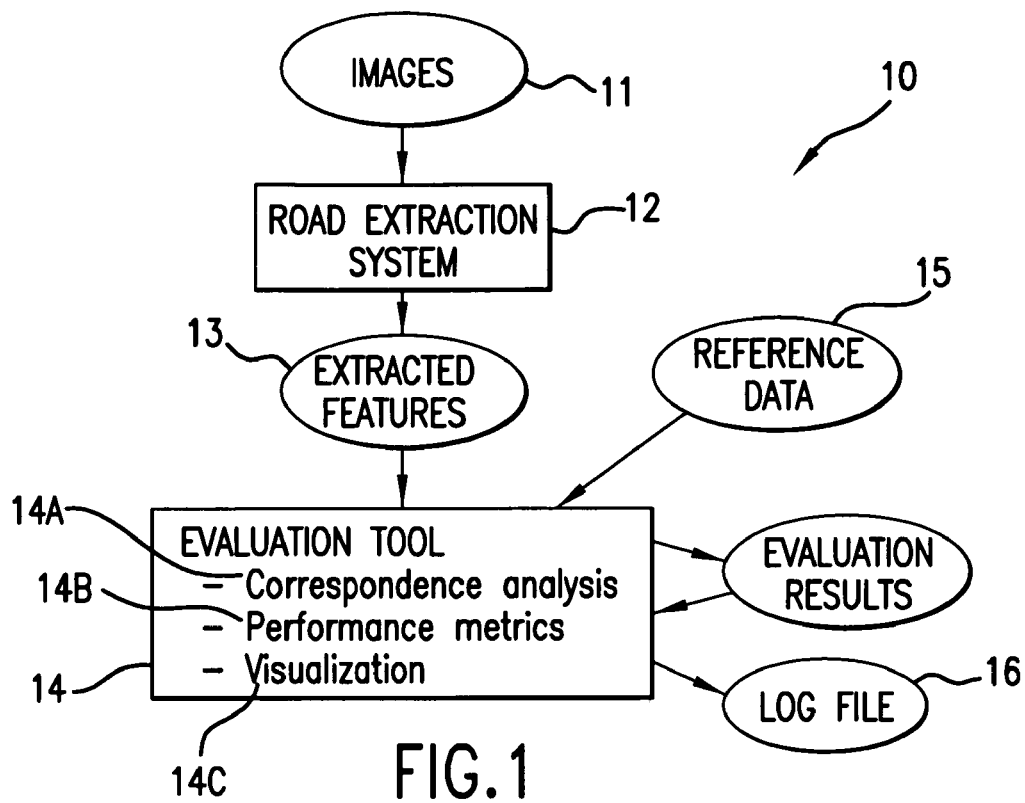
FIG. 1 shows a schematic diagram of a data flow system for road extraction and evaluation, according to an embodiment of the invention, and represents one of many examples of methods that may be employed by extraneous processes to provide the necessary input test vector data set.

FIG. 1 shows a schematic diagram of data flow system 10 for road extraction and evaluation, according to an embodiment of the invention. The system 10 comprises a road extraction system 12 and an evaluation system 14. In the road extraction system 12, road features 13 are produced from input images 11 with variously designed algorithms and their parameters. In this process, enhanced images can also be employed to improve the quality of resulting features.

After road figures are considered, the quality of the result is quantized through the evaluation system 14.

Once the input properties of extracted features and reference data are determined, road feature evaluation is performed with a set of parameters defined by users. The evaluation system 14 finds correspondence between the two data sets and then computes performance metrics based on statistics from correspondence analysis 14A. To track down the whole session of tasks of the evaluation system 14 from starting to ending, a series of comments about the processing information may be recorded into a log file 16 which can be created automatically at the starting point of a session. Various performance metrics 14B can be selectively computed based on the correspondence. The correspondence analysis 14A and performance metrics 14B are described in detail in the following paragraphs.

Correspondence analysis 14A is a process to find matching features in one data set which correspond to features in the other data set. The word "matching" refers to correspondence between entities. The correspondence can be generated mutually in both directions between extracted features and reference data.

For the correspondence analysis 14A, various properties of features such as location, shape, color intensity and relationships with neighborhood can be exploited. In the fields of computer vision and photogrammetry, it is not unusual to utilize those characteristics of features for optimizing the correspondence. Among the available characteristics, location may be used as the fundamental cue to search for corresponding features because it can be used directly for outlining a region which may contain the corresponding features. The process to confine a search space utilizes a geometric relationship between the two data sets. For example, to make the relationship simple, two data sets are registered in a common coordinate system and search spaces for features are easily constructed by a simple overlay of the data sets.

Figure 2:
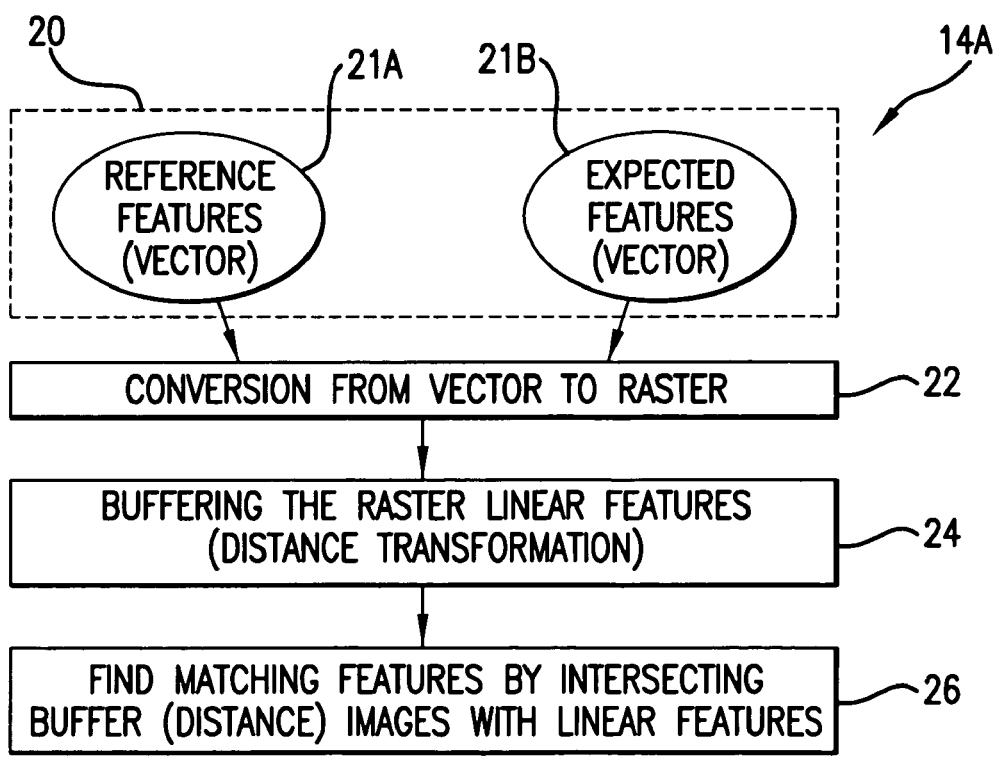
FIG. 2 shows a general flow diagram of a procedure for correspondence analysis, according to an embodiment of the present invention.

FIG. 2 shows a general flow diagram of a procedure for correspondence analysis 14A, according to an embodiment of the present invention. In FIG. 2, a method based on buffering of linear features is used.

The procedure 14A may be divided into three sub-procedures. First, input vectors 20 including reference features vector 21A and extracted features vector 21B are converted into raster data with a certain pixel size, at 22. For example, the unit used can be assumed to be based on ground surface units such as meters. After rasterizing the two data sets 21A and 21B with the same pixel size, the road features are represented by binary images (for example four images) which contain a set of linear features with one pixel wide linked pixels. The pixel size is carefully defined in order to perform an accurate evaluation within a moderate time. If reference data is very accurate, the suitable pixel size can range from the ground unit of the half of the pixel size of the raw image used for road extraction to that of around two pixels. Second, the linear features are buffered, at 24. Specifically, the linear features are dilated with a specified buffer size (distance transformation), which is another parameter for correspondence analysis, at 24. This buffer size can be considered as a search distance in the sense that correspondence is examined within the regions generated with this size. Finally, correspondence is determined by overlay analysis, at 26. Matching features are found by intersecting buffer (distance) images with linear features. The overlay analysis is based on raster overlay and exploits the images (e.g., four images) generated from the previous rasterizing. The four images are: a reference feature image, reference feature buffered image, extracted feature image and extracted feature buffered image. However, depending on the direction of correspondence, different combinations of images can be used. For correspondence from reference to extracted features, the process uses the reference image and buffered image of extracted features. On the other hand, for establishing correspondence from extracted to reference features, the extracted image and buffered image of reference data are used.

A result of correspondence analysis 14A is represented by a labeled image in which each pixel value shows the resulting value of each correspondence analysis such as existence of corresponding features and distance from target features.

The quality of features produced by a specific algorithm can be tested using the results of correspondence analysis 14A. The matching correspondence analysis result can be classified in relation with the concept of hypothesis generation and verification, i.e., TP (true positive), FP (false positive) and FN (false negative). TP represents extracted features which are validated by corresponding reference features. FP represents extracted features which are not valid based on the reference data. FN represents the parts of reference data which have not been extracted. For convenience, the classified parts can be symbolized as follows:

ref: reference feature (TP+FN)
ref.m: matched reference feature ($\approx$TP)
ref.u: not matched reference feature (FN)
extr: extracted feature (TP+FP)
extr.m: matched extracted feature (TP)
extr.u: not matched extracted feature (FP), where the suffix .m and .u represent "matched" and "unmatched", respectively.

In the performance metrics 14B (shown in FIG. 1), metrics can be formulated based on the above defined variables. In one embodiment of the invention, six metrics are used. For example, in order to evaluate the quality of features with different views, the metrics are described in detail in the following paragraphs.

Figure 3:
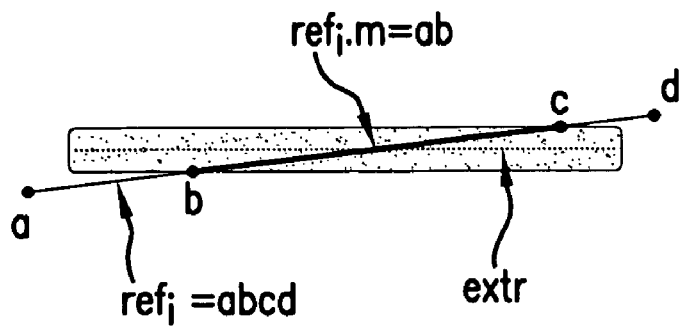
FIG. 3 shows an example of a coverage of a reference feature by a buffered region around an extracted feature, according to an embodiment of the present invention.

One metric that may be used is completeness. Completeness is a metric that measures a quality of extraction based on a coverage of the extraction over a reference data. FIG. 3 shows an example of a coverage of a reference feature by a buffered region around an extracted feature (extr), according to an embodiment of the present invention. This metric computes the percentage of reference data which correspond to extracted features within a specified buffer size, which can be expressed as:

$$\text{completeness} = \frac{TP}{TP+FN} = \frac{\sum ref \cdot m}{\sum ref} \quad (1)$$

Thus, this metric represents how fully the extracted features cover the portion of reference data within a given tolerance of accuracy. For example, a high value of completeness means that the extraction process is performed well with little missing parts of the road network represented by reference data. On the contrary, however, if the value of completeness is low, then the completeness metric indicates that many parts of the road network have not been extracted. A low completeness value may be caused by highly strict conditions on extraction parameters or by real lack of features in the image used for road extraction.

Figure 4:
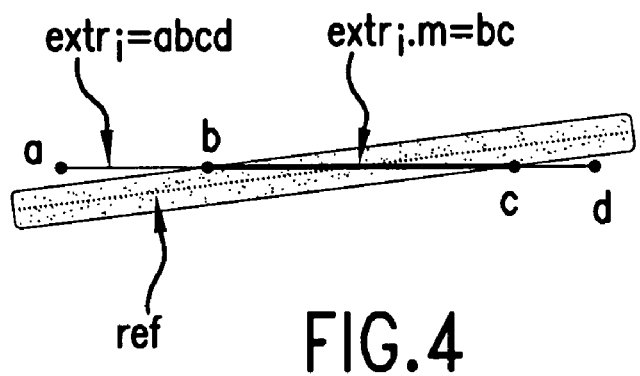
FIG. 4 shows an example of coverage of an extracted feature by a buffer generated around a reference feature, according to an embodiment of the present invention.

Another metric that can be used is correctness. Correctness is a percentage of parts of the extracted features to the whole extracted features which are considered as correct in the sense that those parts correspond to the reference features within a given tolerance. FIG. 4 shows an example of coverage of an extracted feature (extr) by a buffer generated around a reference feature, according to an embodiment of the present invention. The following equation (2) delivers this quantity based on the lengths of the total and matched extraction.

$$\text{correctness} = \frac{TP}{TP + FP} = \frac{\sum extr \cdot m}{\sum extr} \quad (2)$$

Thus, the value of the correctness metric refers to a probability that a segment arbitrarily chosen from the extracted roads belongs to the real road network represented by reference data (ref). A high value of correctness signifies that the extraction process produced road features with few errors. On the other hand, a low value of the correctness signifies that the extraction process generated many invalid features. In the latter case, the problem can be resolved by adapting more strict parameters in the process of road extraction.

A further metric that can be used is quality. The quality metric provides a measure of extraction performance which conceptually combines the two previous metrics, i.e., completeness and correctness, in a conservative way. Thus, to obtain a high value of quality, both completeness and correctness are expected to be large with a use of a suitable algorithm which can produce most parts of a road network with few errors. The quality metric can be expressed as follows:

$$\text{quality} = \frac{TP}{TP + FP + FN} = \frac{\sum extr \cdot m}{\sum extr + \sum ref \cdot u} \quad (3)$$

Figure 5:
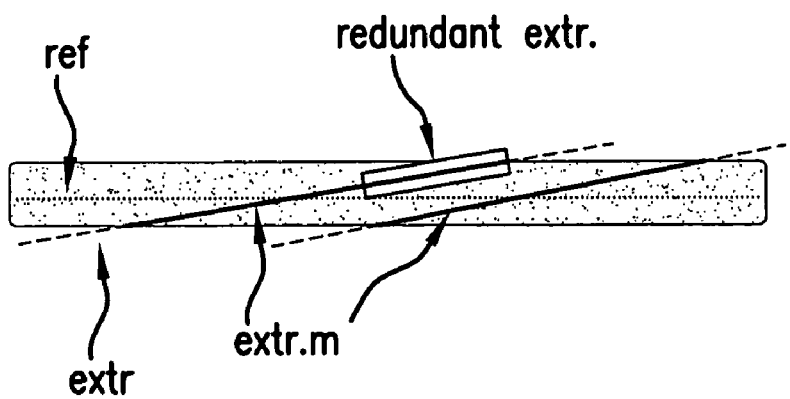
FIG. 5 shows an example of a redundant part of extracted features compared with a reference feature, according to an embodiment of the present invention.

Another metric that can be used is redundancy. The redundancy is the percentage of extracted features which are redundant to each other, i.e. which correspond to the same reference features. FIG. 5 shows an example of a redundant parts of extracted features compared with a reference feature. The redundancy is observed by crosschecking the matching parts in two directions and by differencing the resulting lengths of matched extraction and matched reference. Equation (4) calculates the redundancy based on the two matching results.

$$\text{redundancy} = \frac{\sum extr \cdot m - \sum ref \cdot m}{\sum extr \cdot m} \quad (4)$$

If the matching is unique, the value of redundancy should be zero. However, multiple extracted features corresponding to the same reference feature increase this value. This problem can occur when two roads are extracted from the sides of a single or from multiple lanes. Thus, algorithms can be designed to extract only a representative centerline of a road.

Also, redundancy can be generated artificially with a wide buffer size. To avoid this problem, a buffer size which is less than the average of road width can be selected. This can prevent the buffering from including adjacent roads into a search space.

Figure 6:
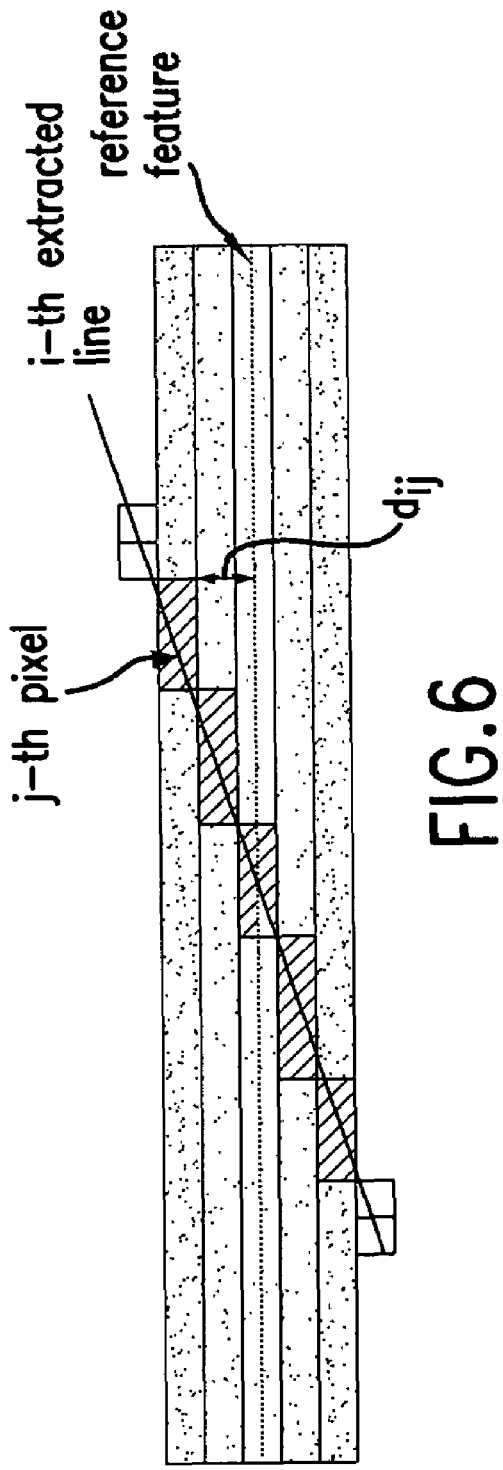
FIG. 6 shows the features of reference and extraction in raster format, according to an embodiment of the present invention.

Another metric that can be used is distance statistics. Geometric accuracy of the extracted features can be evaluated by measuring distance from their corresponding features in reference data. FIG. 6 shows the features of reference and extraction in raster format, according to an embodiment of the present invention.

To compute the accuracy of matched extraction, only the parts of extracted features which are within a given size of buffer, as shown in FIG. 6, are considered for collecting the distance data. Average distance and standard deviation of distance are computed based on the collected distance values, which are expressed as:

$$\text{average distance } (m_d) = \frac{\sum_i \sum_j d_{ij}}{\sum extr \cdot m} \quad (5)$$

$$\text{std. of distance} = \sqrt{\frac{\sum_i \sum_j d_{ij}^2}{\sum extr \cdot m - 1}}. \quad (6)$$

where $d_{ij}$ is a distance value from a j-th pixel located on an i-th extracted feature. The value of standard deviation of distance delivers the information about the distribution of distance under the assumption of unbiasedness of the distribution, which implies that the extracted features are randomly distributed around the reference data. To achieve this random distribution, the two data sets (reference data and extracted data) are tightly co-registered so that no offset exists between the two data sets.

Figure 7:
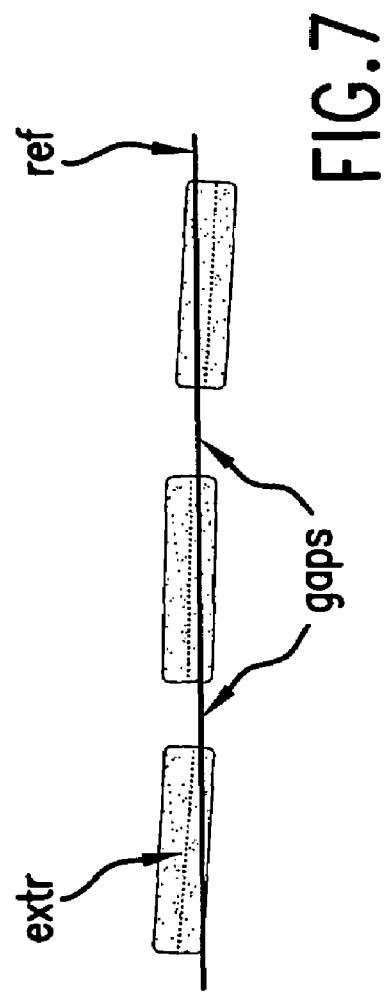
FIG. 7 shows gaps caused by discontinuities between the extracted features, according to an embodiment of the present invention.

Another metric that can be used is gap statistics. A gap is a lack of connection between extracted features corresponding to a single reference. FIG. 7 shows the gaps caused by discontinuities between the extracted features. Equation 7 shows a metric for computing the number of gaps per kilometer, which counts the average occurrence of gaps within one kilometer. Equation 8 presents the average length of gaps.

$$\text{No. of gaps per km} = \frac{n}{\sum ref \cdot m} \quad (7)$$

$$\text{average gap length} = \frac{\sum gap}{n} \quad (8)$$

The gaps may result from, for example, a weakness of road signature in the parts or from occlusions induced by other objects such as mountains and/or buildings. To overcome these problems, segments which connect the fragmented segments can be hypothesized and then verified through collecting evidences such as straightness and connectivity.

The evaluation system 14 (shown in FIG. 1) also includes a visualization interface or graphical interface 14C which allows a user to visualize and interact with the inputs (such as images 11) and the results obtained from the extraction system 12, correspondence analysis 14A and/or the performance metrics 14B. The visualization interface 14C is described in detail in the following paragraphs.

In one embodiment of the invention, the road evaluation system 10 is developed based on Matlab version 6.1. Hence, the programs are coded in Matlab m files and the user interface is designed using a graphic user interface (GUI) design tool. Because Matlab supports axes components for displaying graphics such as plots and images, it is efficient to integrate image processing and visualization functions into one interface through Matlab. However, it must be appreciated that the road evaluation system 10 can be implemented using a different programming language, using a different mathematical programming package or using multiple programming languages or multiple mathematical programming packages. For example a portion of the road evaluation system 10 can be developed using one programming language and/or mathematical programming package and another portion of road evaluation system 10 can be developed using another programming language and/or another mathematical programming package.

Figure 8:
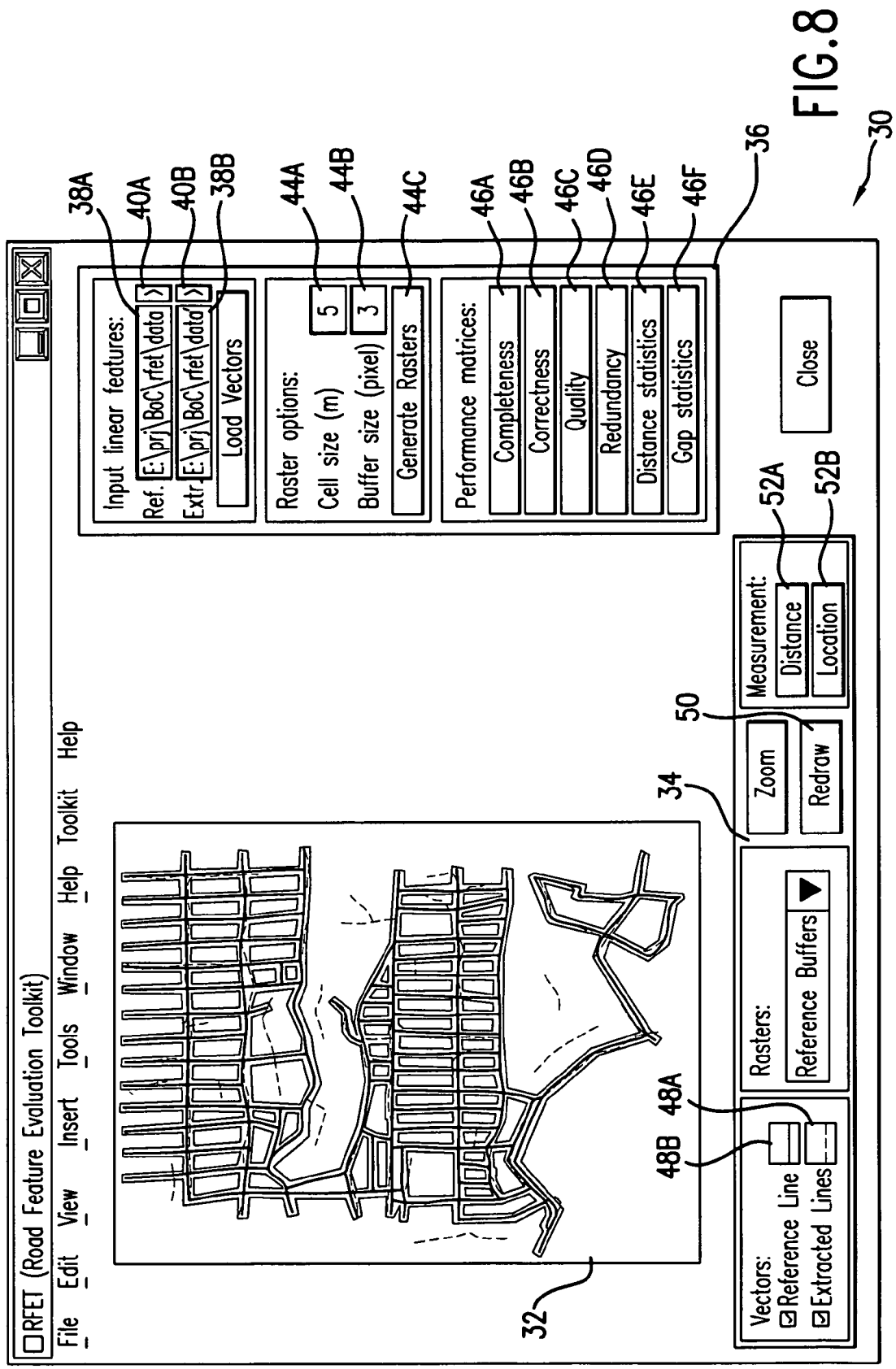
FIG. 8 shows a main graphical interface window of the road evaluation system, according to an embodiment of the present invention.

FIG. 8 shows a main graphical interface window 30 of the road evaluation system 10, according to an embodiment of the present invention. The graphical interface 30 is divided into three broad groups: layer display axis 32, layer display control board 34, and processing board 36. First, the display axis 32 provides graphic display of layers which are selected to be displayed in layer display control interface 34. Second, layer display control board 34 is located at the bottom of the window and used to manage layers to be displayed and selection of colors. Third, processing board 36 is located at the right side of the window and provides interfaces to input parameters and to choose processes to be performed.

The controls of edit boxes, pushbuttons, and other buttons are automatically activated or deactivated by the status of processing. For example, if input vectors are not loaded, then the processes following this process are all deactivated. Thus, in this case, a user cannot access controls for rasterizing.

Input files can be entered using edit boxes 38A, 38B or pushbuttons 40A, 40B located just beside the edit boxes 38A and 38B, which provides a convenient way to choose files with the Windows File Browser. By clicking the pushbutton "Load vectors" 42, the vectors are loaded into Matlab variables. The edit box "Cell size" 44A and "Buffer size" 44B control the pixel size of images and buffer size for distance transformation, respectively.

Figure 9A:
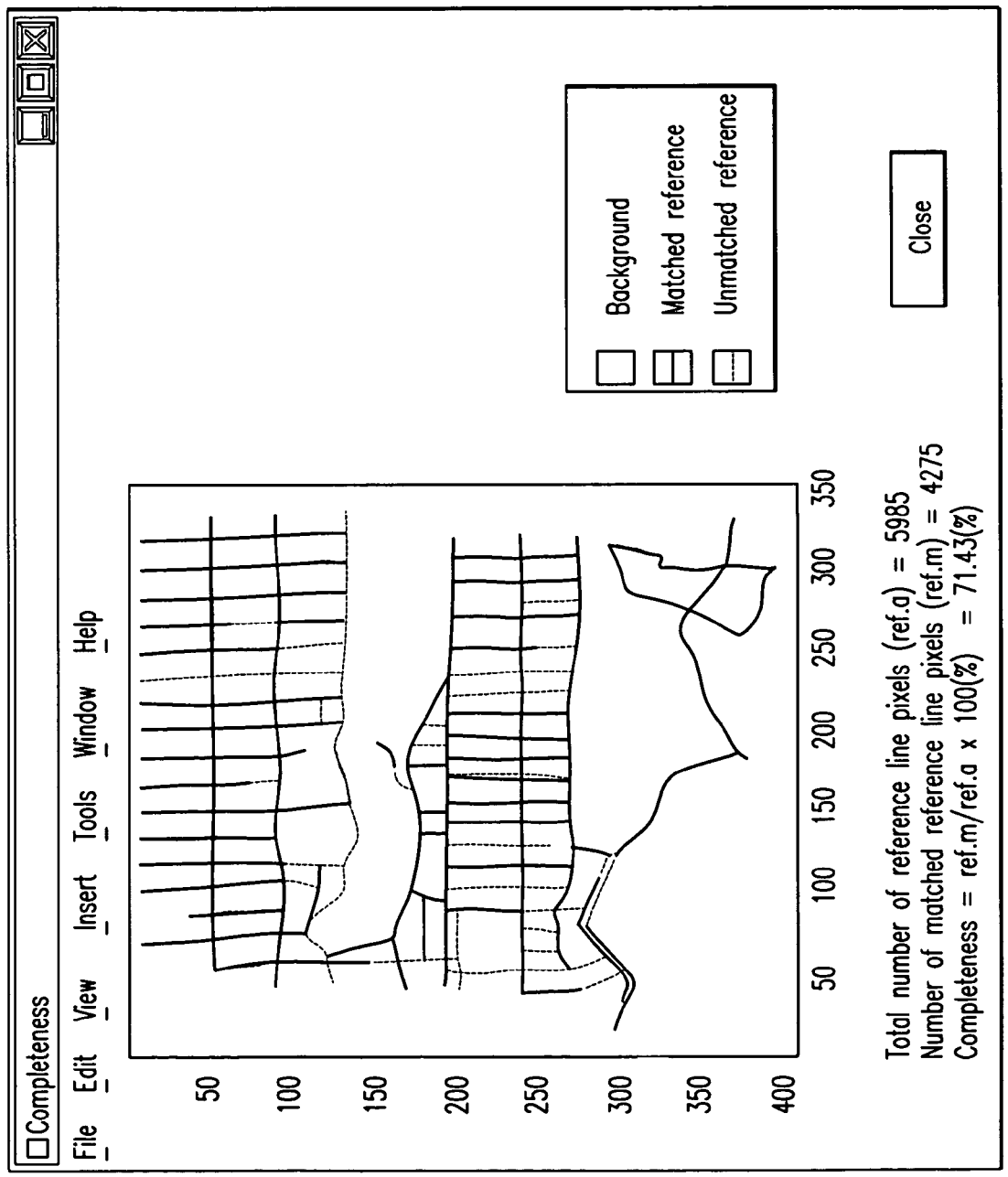
FIG. 9A shows a result obtained from computing a completeness metric.
Figure 9B:
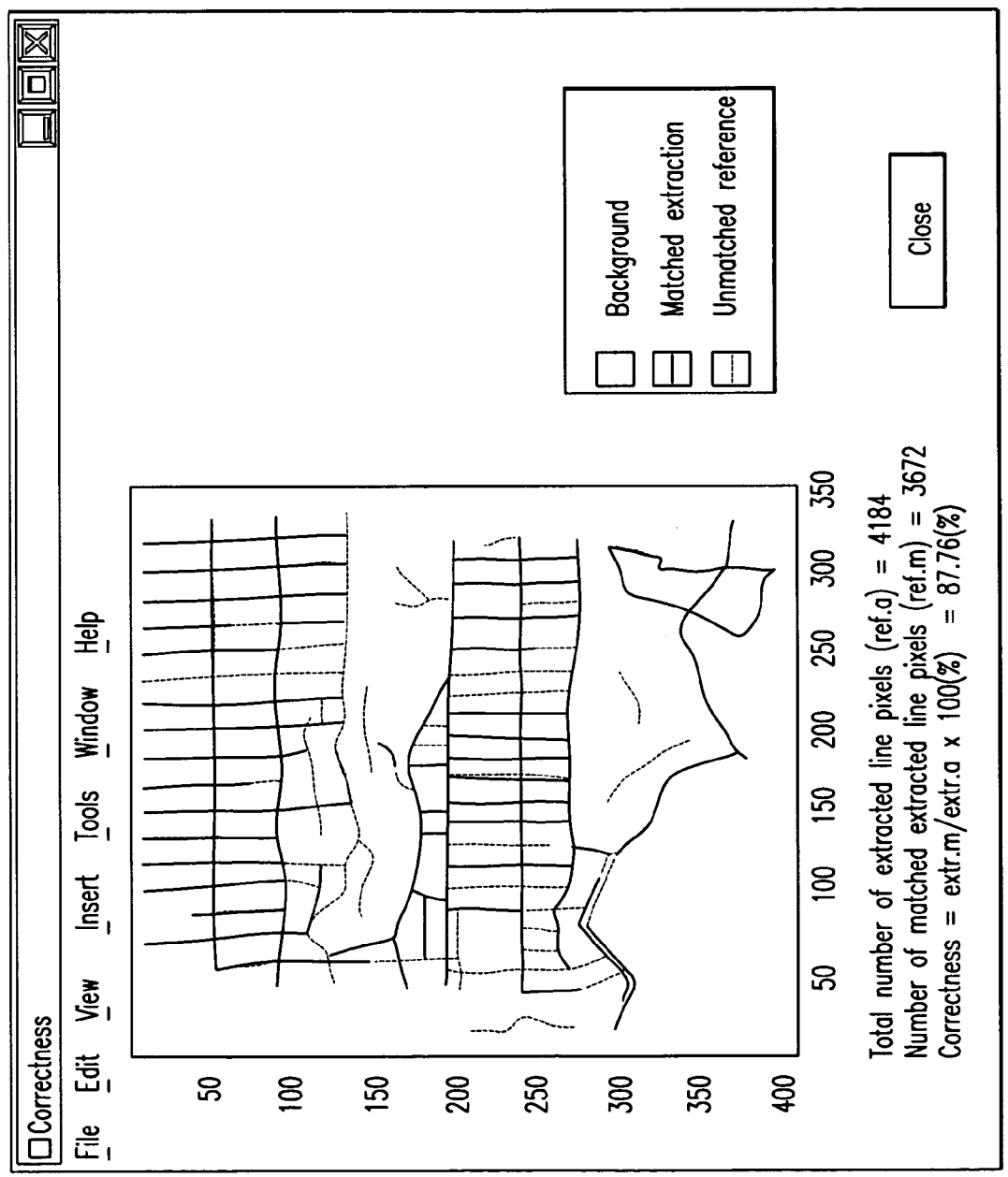
FIG. 9B shows a result obtained from computing a correctness metric.
Figure 9C:
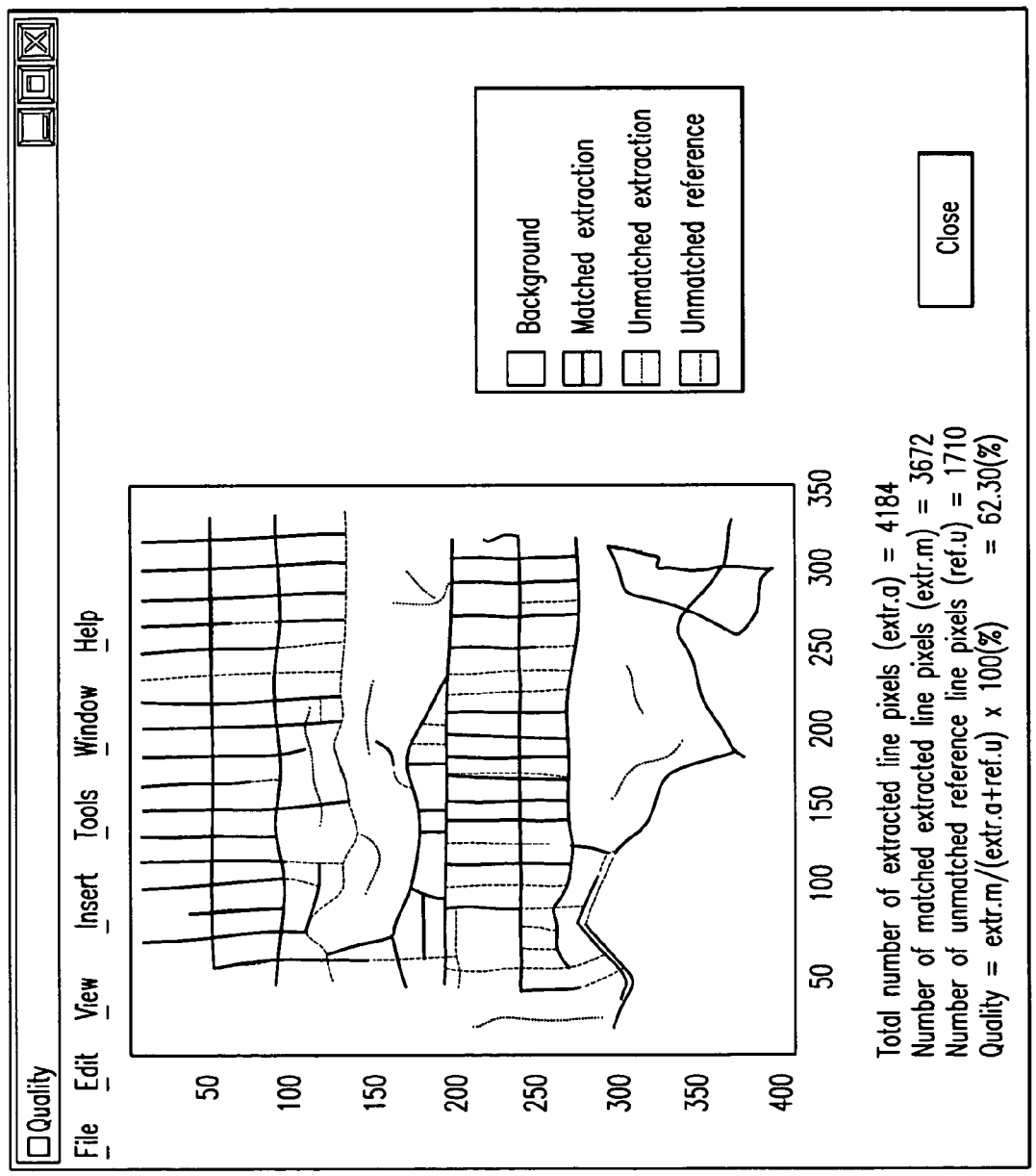
FIG. 9C shows a result obtained from computing a quality metric.
Figure 9D:
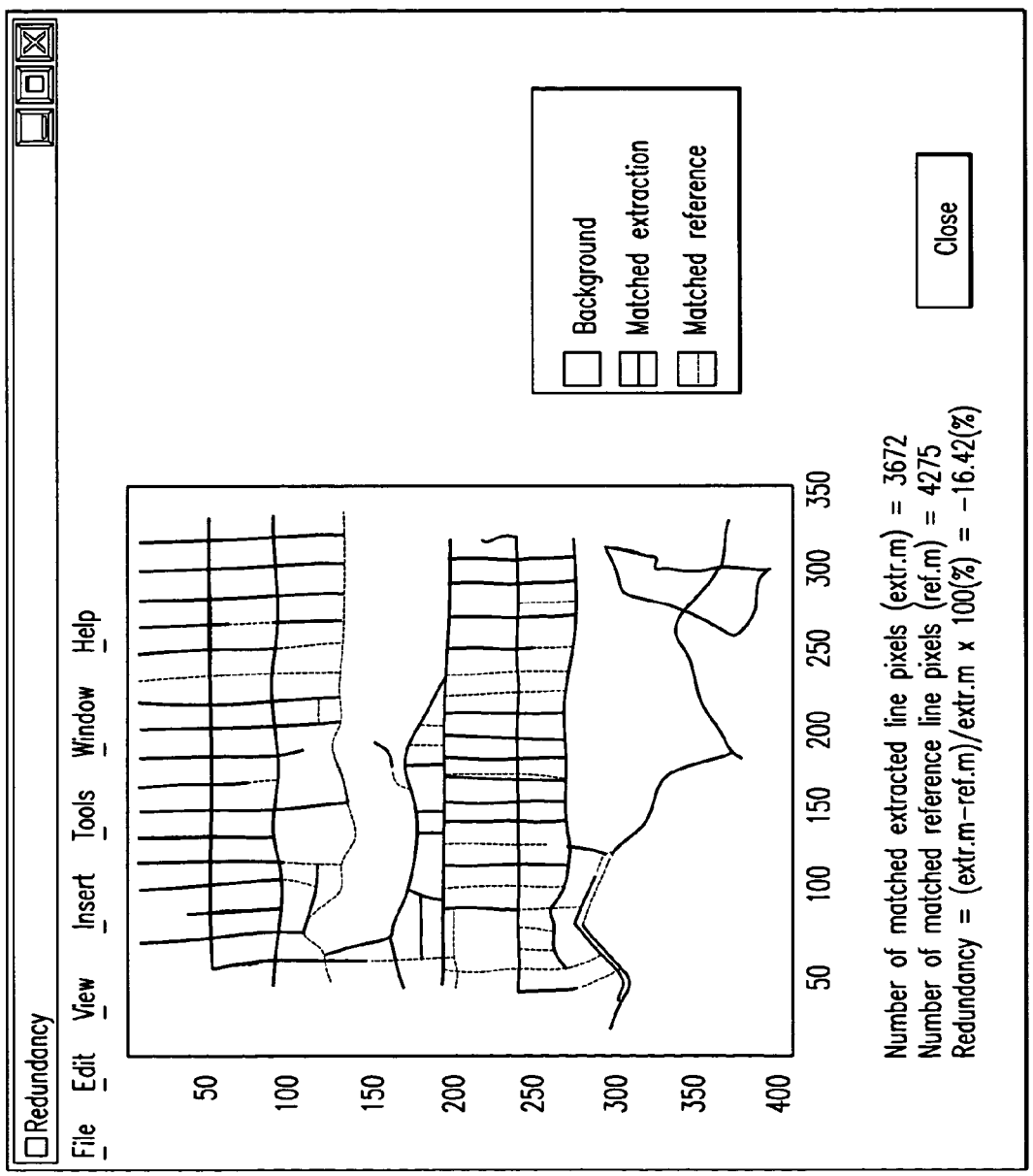
FIG. 9D shows a result obtained from computing a redundancy metric.
Figure 9E:
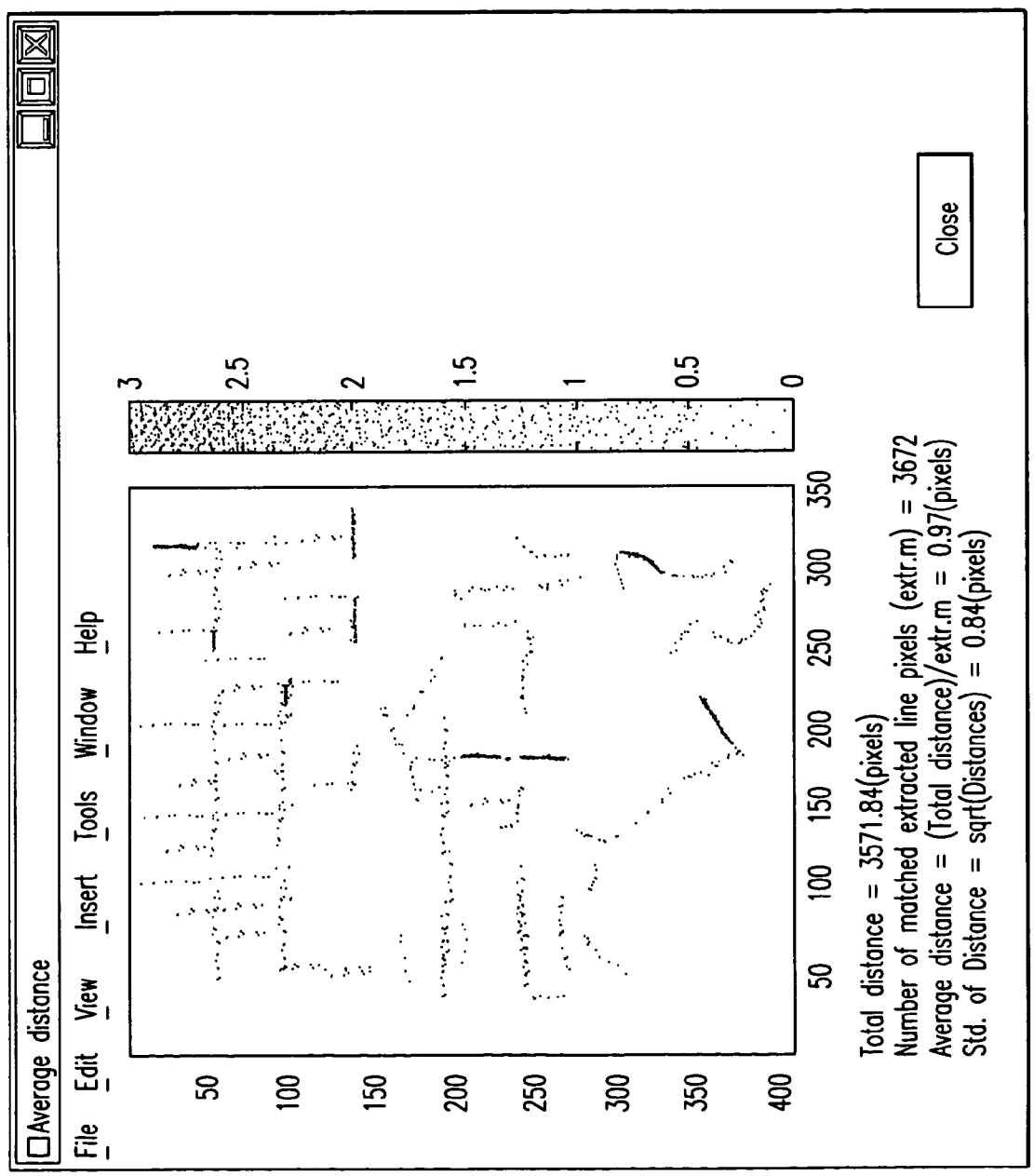
FIG. 9E shows a result obtained from computing a distance statistics metric.
Figure 9F:
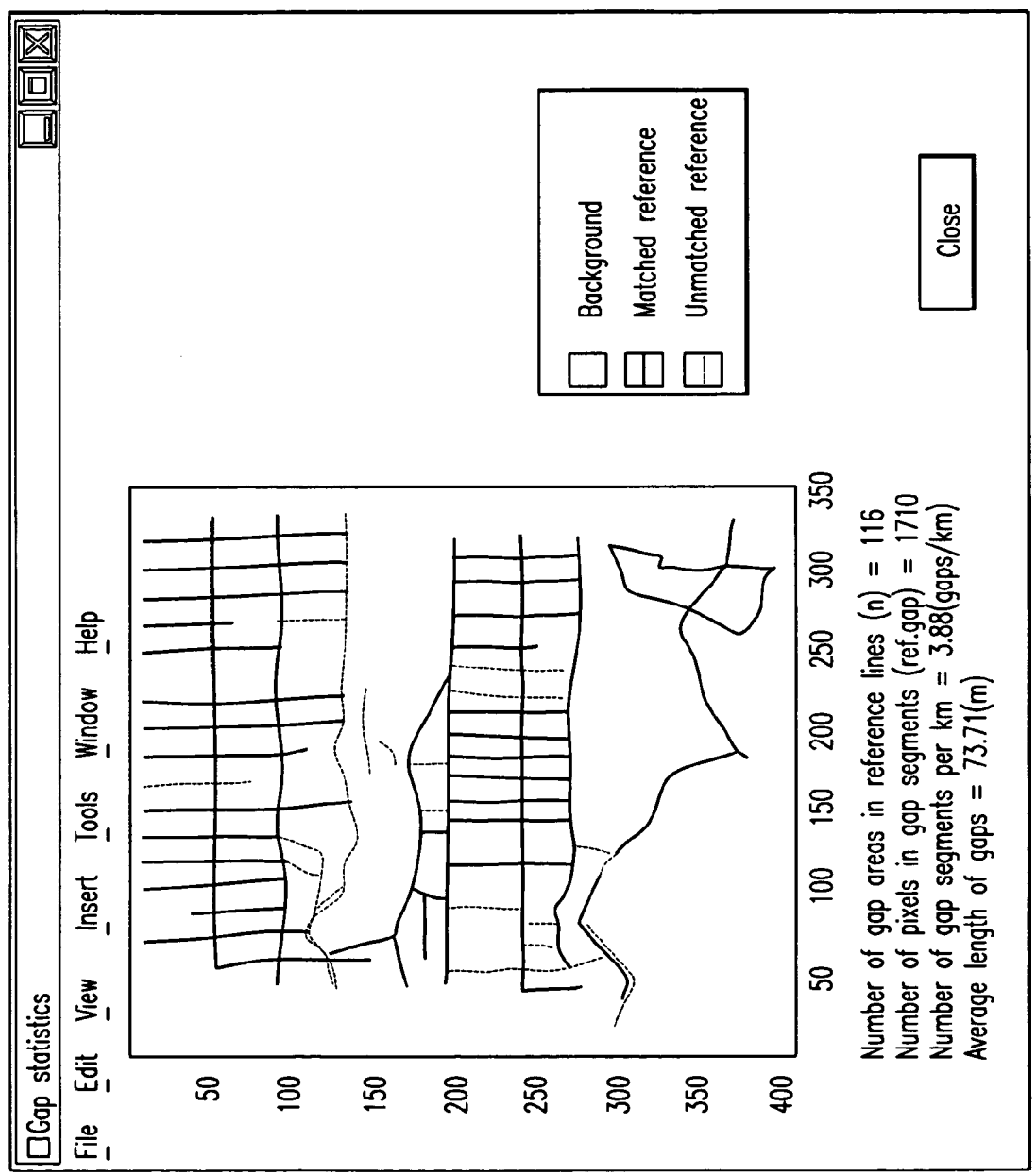
FIG. 9F shows a result obtained from computing a gap statistics metric.

Once features are converted into images and buffers are generated around the features, each metric can be computed separately by clicking the pushbuttons of metrics completeness 46A, correctness 46B, quality 46C, redundancy 46D, distance statistics 46E and gap statistics 46F. A detailed description of each of the metrics is provided in the above paragraphs. After computing each metric, the road evaluation system 10 creates a graphics and displays the results with labeled images. FIGS. 9A-F show examples of results obtained from computing the performance metrics, according to an embodiment of the present invention. FIG. 9A shows the result obtained from computing the completeness metric. FIG. 9B shows the result obtained from computing the correctness metric. FIG. 9C shows the result obtained from computing the quality metric. FIG. 9D shows the result obtained from computing the redundancy metric. FIG. 9E shows the result obtained from computing the distance statistics metric. FIG. 9F shows the result obtained from computing the gap statistics metric.

Layer display interface 32 allows a user to display vector and raster layers selectively. Vector layers can be chosen independently. In the case of raster layers, however, only one layer can be chosen through the popup menu button of "Raster" 44C. The user can customize a color of vector layers by clicking color legend buttons 48A and 48B. After setting display options, graphic display in the main axis is refreshed by clicking the pushbutton "Redraw" 50.

In one embodiment of the invention, to make the evaluation procedure more efficient, location and distance measurement functions are added. Buttons 52A and 52B associated with the location and distance function, respectively, are displayed in the GUI 30. The "Location" function delivers the absolute position in a given coordinate system. The "Distance" function provides Euclidean distance between two points defined by pointer activation, for example mouse clicking.

A log file is created at a beginning of a session. A filename is automatically generated using the date and time when the program is started, for example, "rfet_log_20040115T110345.txt." The log file records information about system environment and sequentially writes processes implemented.

In one embodiment, the road evaluation system 10 is used to evaluate features from a GIS database. A set of road features in the GIS database is selected as the reference data set. Then, a set of extracted features is produced by digitizing the reference data set on screen. Because all types of extraction errors such as gaps, missing parts, redundant parts and geometric inaccuracies are considered, a test data set can be used to validate the road evaluation system 10 and to implement performance evaluations. The reference and extracted data sets in vector format with an image of reference buffers are shown in FIG. 8.

In one embodiment, a series of tests are implemented by varying parameters of cell size, which controls the pixel size of images, and buffer size which control the size of the buffer for distance transformation. Because the cell size and buffer size parameters impact on correspondence analysis, it may be useful to analyze the resulting metrics on the consideration of the parameters. First, three cell sizes are chosen: 2.5, 5 and 10 meters, for example. Then, for each cell size, different buffer sizes ranging from 2 to 5 pixels are combined to perform correspondence analysis. All the metrics are computed based on the combinations of parameters. Table 1, 2 and 3 show the metrics based on each combination. TABLE 1 shows the performance metrics (completeness, correctness, quality, redundancy, standard distance and number of gaps) with cell size 2.5 meters at varying buffer size (2, 3, 4 and 5). TABLE 2 shows the performance metrics (completeness, correctness, quality, redundancy, standard distance and number of gaps) with cell size 5 meters at varying buffer size (2, 3, 4 and 5). TABLE 3 shows the performance metrics (completeness, correctness, quality, redundancy, standard distance and number of gaps) with cell size 10 meters at varying buffer size (2, 3, 4 and 5).

TABLE 1

PERFORMANCE METRICS WITH CELL SIZE = 2.5 METERS

| Buffer size Metrics | 2 (5 m) | 3 (7.5 m) | 4 (10 m) | 5 12.5 m | Avg. |
|---|---|---|---|---|---|
| Completeness (%) | 41.90 | 52.18 | 60.00 | 66.95 | 55.26 |
| Correctness (%) | 58.89 | 70.97 | 79.12 | 84.90 | 73.47 |
| Quality (%) | 31.89 | 41.82 | 49.99 | 57.30 | 45.25 |
| Redundancy (%) | −3.68 | −7.14 | −10.51 | −14.92 | −9.06 |
| Std. Distance (m) | 1.8 | 2.38 | 2.95 | 3.48 | 2.65 |
| No. Gaps/km (/km) | 6.56 | 5.32 | 5.86 | 4.56 | 5.58 |

TABLE 2

PERFORMANCE METRICS WITH CELL SIZE = 5 METERS

| Buffer size<br>Metrics | 2<br>(10 m) | 3<br>(15 m) | 4<br>(20 m) | 5<br>(25 m) | Avg. |
|---|---|---|---|---|---|
| Completeness (%) | 62.41 | 71.43 | 76.34 | 81.40 | 72.90 |
| Correctness (%) | 81.88 | 87.76 | 89.22 | 89.87 | 87.18 |
| Quality (%) | 53.25 | 62.30 | 66.66 | 70.98 | 63.30 |
| Redundancy (%) | −9.02 | −16.42 | −22.39 | −29.57 | −19.35 |
| Std. Distance (m) | 3.5 | 4.2 | 4.5 | 4.8 | 4.25 |
| No. Gaps/km (/km) | 5.51 | 3.88 | 3.48 | 3.01 | 3.97 |

TABLE 3

PERFORMANCE METRICS WITH CELL SIZE = 10 METERS

| Buffer size<br>Metrics | 2<br>(20 m) | 3<br>(30 m) | 4<br>(40 m) | 5<br>(50 m) | Avg. |
|---|---|---|---|---|---|
| Completeness (%) | 77.02 | 85.28 | 90.08 | 93.64 | 86.51 |
| Correctness (%) | 89.40 | 90.71 | 91.55 | 92.34 | 91.00 |
| Quality (%) | 67.88 | 75.40 | 80.53 | 84.89 | 77.18 |
| Redundancy (%) | −18.85 | −29.70 | −35.75 | −39.89 | −31.05 |
| Std. Distance (m) | 5.8 | 6.4 | 7.1 | 8.1 | 6.85 |
| No. Gaps/km (/km) | 3.18 | 2.40 | 1.66 | 1.12 | 2.09 |

It can be noted from the results in the TABLES 1, 2 and 3, that the metrics tend to vary depending on the cell size and buffer size. For example, large values of the parameters make completeness, correctness and quality increase. This explains that larger search distance for matching features produce more corresponding features in both directions of matching. In addition, it can be observed that parameter combinations with similar buffer size on the ground deliver similar metric values. For example, the combination of cell size 2.5 meter and buffer size 4 pixels produces metric values close to the combination of cell size 5 meter and buffer size 2 pixels.

Metrics can be measured accurately based on smaller cell size and buffer size. However, the small sizes cause the search region to be reduced, resulting in low values of completeness, correctness and quality. For example, the experiment with cell size 2.5 meter and buffer size 2 pixels shows lowest values of the metrics. Therefore, there is trade-off between the accuracy of measurement and the size of search space. Hence, in order to obtain appropriate evaluation of features, a suitable combination of the parameters may be selected.

In order to improve upon the computation speed, the degree of accuracy of the road evaluation system, to extract nodes at junctions and analyze the correspondence or analyze the horizontal accuracy of a vector data set based upon a user supplied set of reference points and a vector data set to be evaluated, an enhanced road evaluation system is implemented.

The enhanced road evaluation system utilizes the relationships between original vector lines and raster pixels. The relationships are the existence of a line, length, distance, and orientation. The relationships are recorded into four raster layers. These four raster layers are a line raster layer, a length raster layer, a distance raster layer and an orientation raster layer. These layers are generated during rasterizing and buffering processes and their combination at a pixel provides a link between a pixel and its closest (perpendicular) point on a vector line. Thus, after finding a matching pixel, the location and length of matching at the pixel are refined further by the values stored in the raster layers. The rasterizing and buffering processes are part of a method referred to herein as raster-based reference for vector matching (RBRVM).

RBRVM makes the measurement of the matching length and displacements more precise without using a small pixel size definition. In real world applications, the RBRVM method provides rapid matching and more accurate measurement of the correspondence quality.

Figure 10:
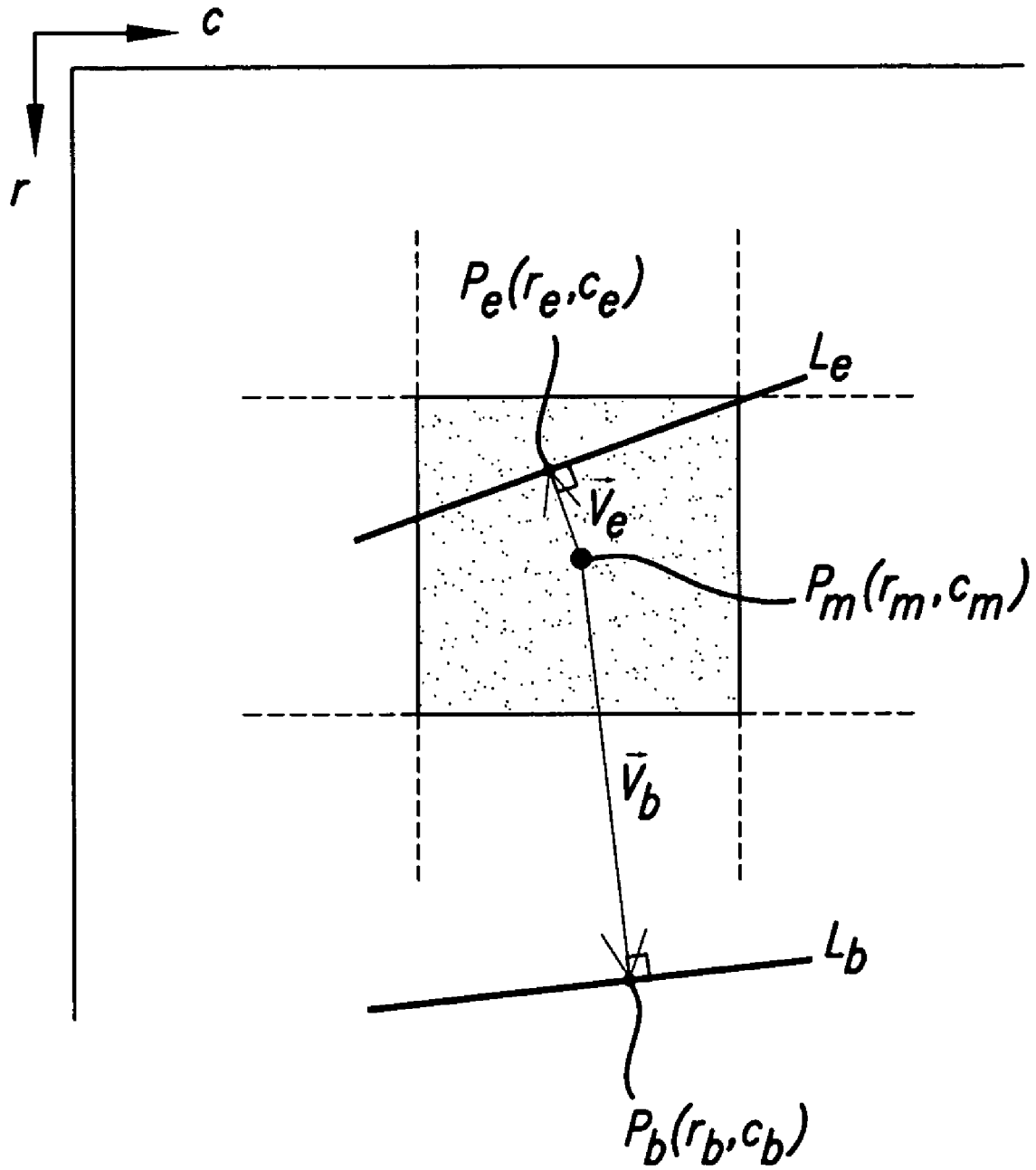
FIG. 10 illustrates vectors for retrieving corresponding points on original lines, according to an embodiment of the present invention.

FIG. 10 illustrates vectors for retrieving corresponding points on original lines, according to an embodiment of the present invention. In this embodiment, point $P_m$ is the matching pixel resulting from correspondence analysis, with line $L_e$ being evaluated based on the reference line $L_b$. Points $P_e$ and $P_b$ are considered as the refined locations of point $P_m$ on the vector lines $L_e$ and $L_b$. Points $P_e$ and $P_b$ are the closest points from point $P_m$. Thus, after obtaining a matching pixel $P_m(r_m, c_m)$, its corresponding locations $P_e$ and $P_b$ in the original vector dataset can be retrieved by adding the vectors $\vec{v}_e$ and $\vec{v}_b$, respectively, to point $P_m$.

Therefore, the RBRVM method makes the measurement of two basic matching components, i.e., matching length and matching displacement between matching features, more precise. Specifically, the matching length is obtained by measuring the length of line $L_e$ within the matching pixel $(r_m, c_m)$. The displacement between matching points are observed by subtracting the coordinates of point $P_e$ from point $P_b$.

Figure 11:
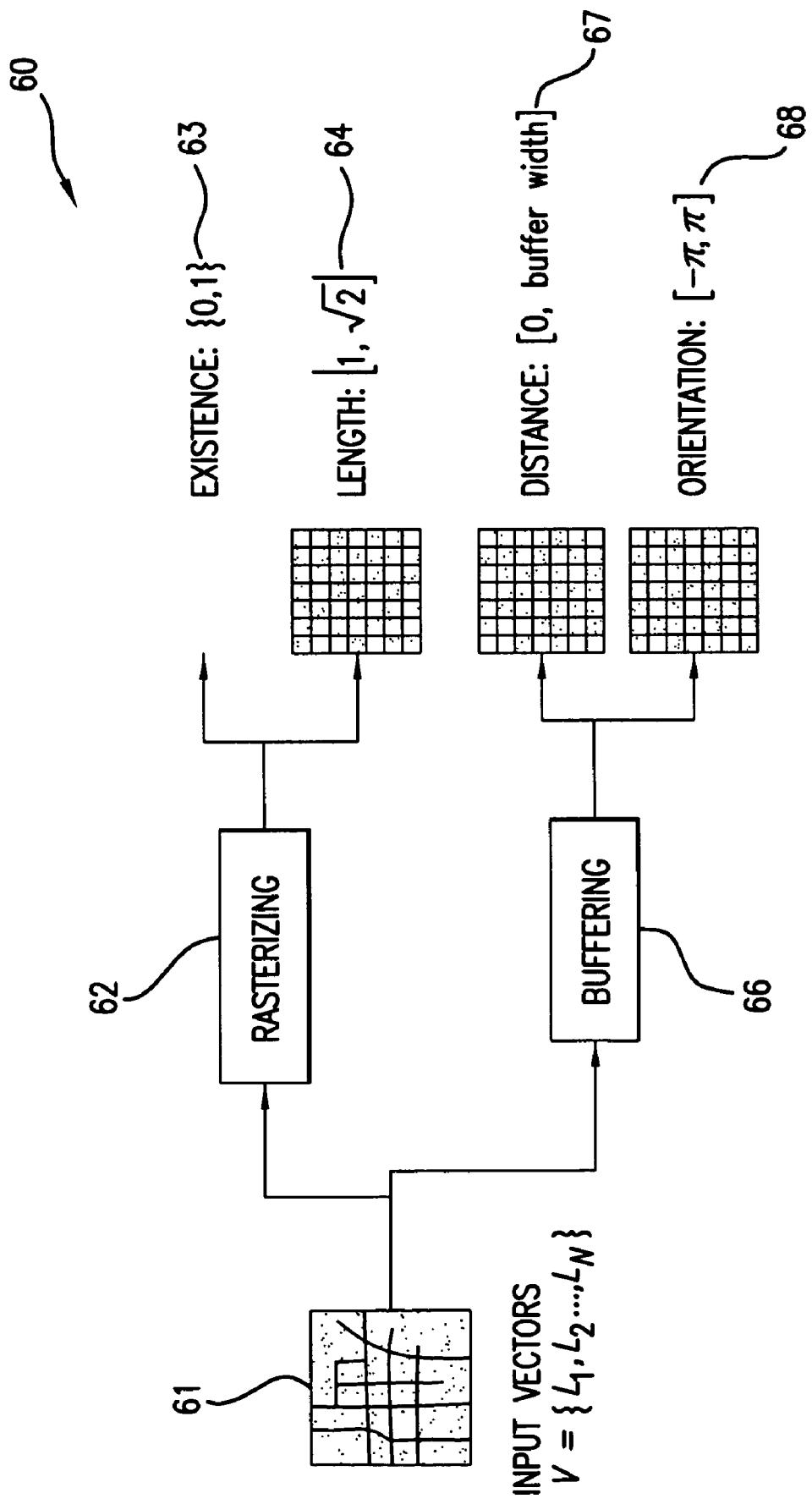
FIG. 11 illustrates a flow diagram of a procedure for generating a set of raster layers for each data set, according to an embodiment of the present invention.

To perform correspondence analysis based on the RBRVM method, a set of raster layers are generated for each data set by a procedure. FIG. 11 illustrates a flow diagram of a procedure 60 for generating a set of raster layers for each data set, according to an embodiment of the present invention. First, in a rasterizing process 62, input vector lines 61 are drawn in existence layer 63 with values 0 for negative pixels and 1 for positive pixels and a length of the vector lines 61 at the positive pixels is recorded in a length layer 64. The length is in the range of 1 to $\sqrt{2}$. Second, in a buffering process 66, a buffer area is generated around a line segment and then a distance 67, within the range of 0 to a buffer width, and an orientation 68, within the range −π to π are computed at the pixels within the buffer. The ranges of the raster pixel values are summarized in FIG. 11. Assignment of the pixel values are described in detail in the following paragraphs.

Figure 12:
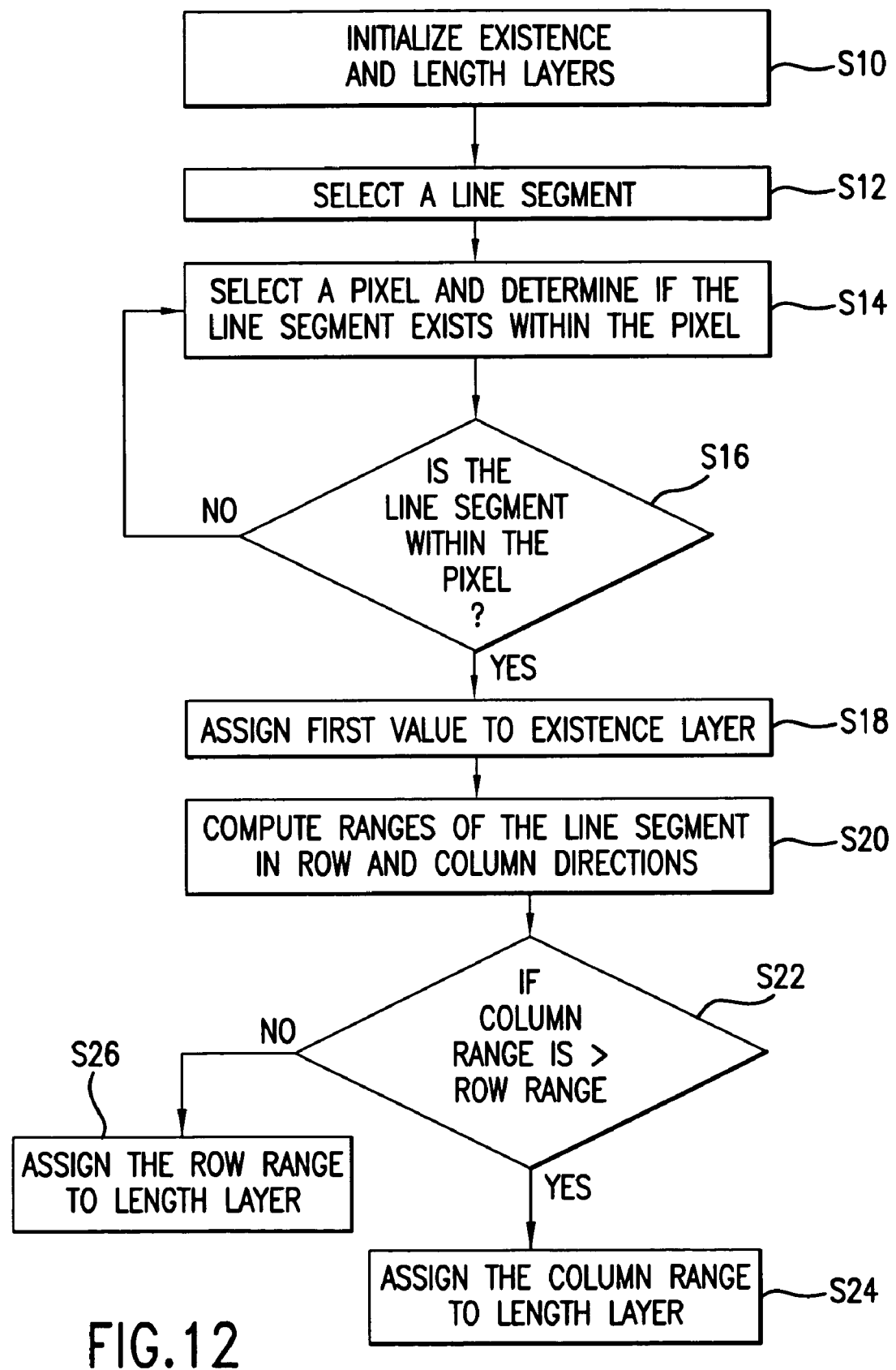
FIG. 12 depicts a process of rasterizing, according to an embodiment of the present invention.

FIG. 12 depicts a process of rasterizing, according to an embodiment of the present invention. The rasterizing process for generating the two raster layers (the existence layer and length layer) starts by initializing an existence layer and a length layer by assigning 0 to all their pixels, at S10. The rasterizing process continues by selecting a line segment from a line dataset, at S12. The rasterizing process progresses by selecting a pixel and determining if the line segment exits within the pixel, at S14. A test is then performed, to determine if the selected line segment is within the pixel, at S16. If the line segment is within the pixel, a value of 1 is assigned to the existence layer, at S18. If the line segment is not within the pixel, a value 0 is assigned to the existence layer and another pixel is selected and the determining if the selected line segment exits within the pixel is repeated. If the line segment is within the pixel, the process continues by computing the line segment's ranges (i.e., projections) in the row and column directions, at S20. The process of rasterizing then proceeds by performing a logic test, at S22. If the column range of the line segment is larger than the row range, the column range is assigned to the length layer along the column direction, at S24. The coordinate pair where the line segment enters and exits the cell (as shown, for example, in FIG. 13) can be used to compute the length of the line segment. If the column range of the line segment is not larger than the row range, i.e., the column range of the line segment is smaller than or equal to the row range, the row range is assigned to the length layer along the row direction, at S26.

The process may further include repeating selecting a next line segment in the input dataset and selecting a pixel and determining if the line segment exits within the pixel, testing if the line segment is within the pixel, repeating the computing of the ranges in the row and column direction and repeating the assigning of a certain length to the length layer. The repeating loop may be run until the end of the data set.

Figure 13:
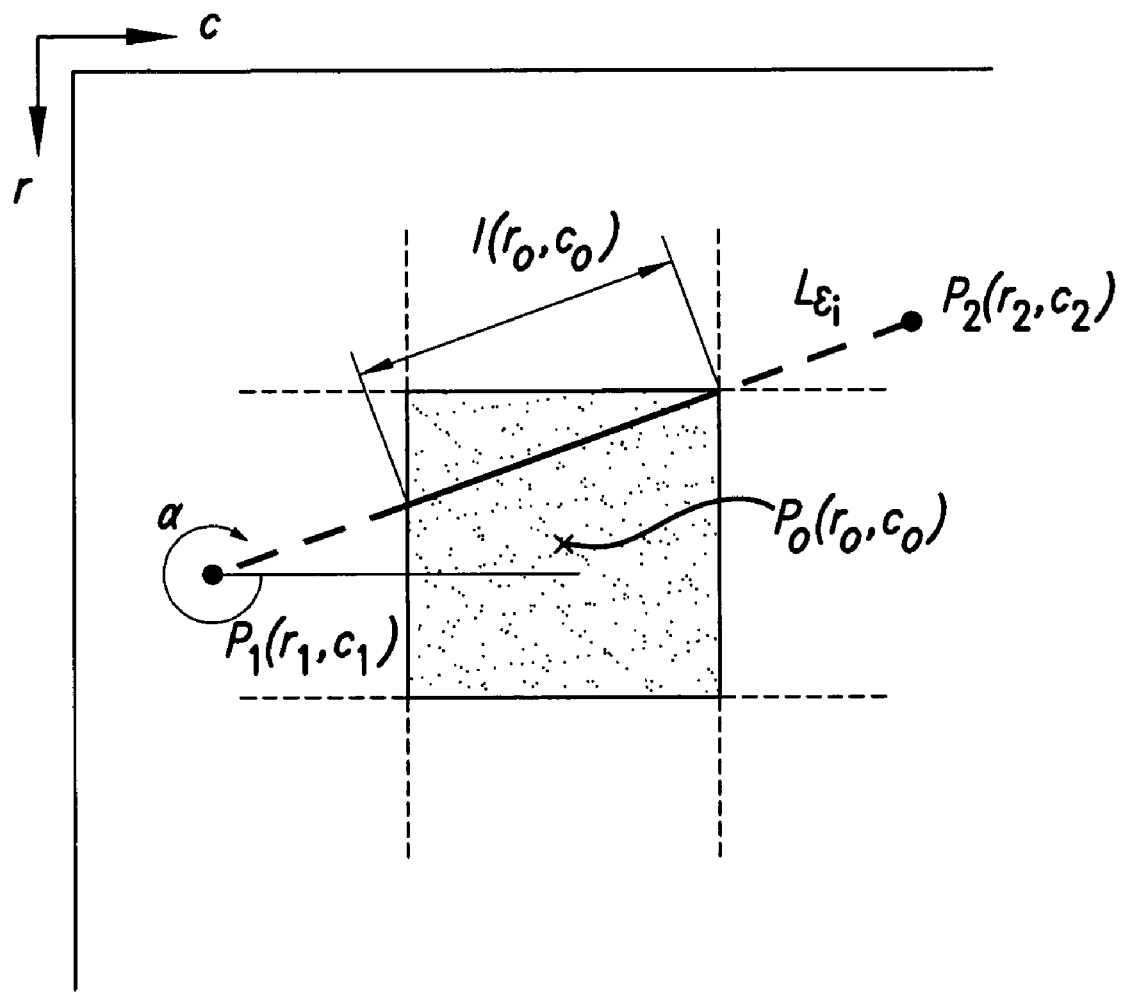
FIG. 13 illustrates a relationship between a slope and a length of a line segment, according to an embodiment of the present invention.

The length of the line segment within a pixel can be assigned using the slope of the line segment. FIG. 13 illustrates a relationship between a slope and a length of a line segment, according to an embodiment of the present invention. Angle α denotes the slope of the line segment and scalar amount l denotes the length of the line segment $L_{E_l}$ within a pixel $(r_o, c_o)$. With reference to the FIG. 13, the length l is derived as follows.

First, the amounts of movements in the column and row directions are expressed from end points $P_1(r_1, c_1)$ and $P_2(r_2, c_2)$ of line $L_{E_l}$ as:

$$\Delta r = r_2 - r_1 \quad (9)$$

$$\Delta c = c_2 - c_1.$$

The value l at a pixel is then computed as:

$$I_l(r_o, c_o) = l(r_o, c_o) = \frac{1}{\cos\alpha} = \begin{cases} \frac{(\Delta r^2 + \Delta c^2)^{1/2}}{|\Delta c|}, & \text{if } \Delta c > \Delta r \\ \frac{(\Delta r^2 + \Delta c^2)^{1/2}}{|\Delta r|} & \text{otherwise.} \end{cases} \quad (10)$$

Figure 14:
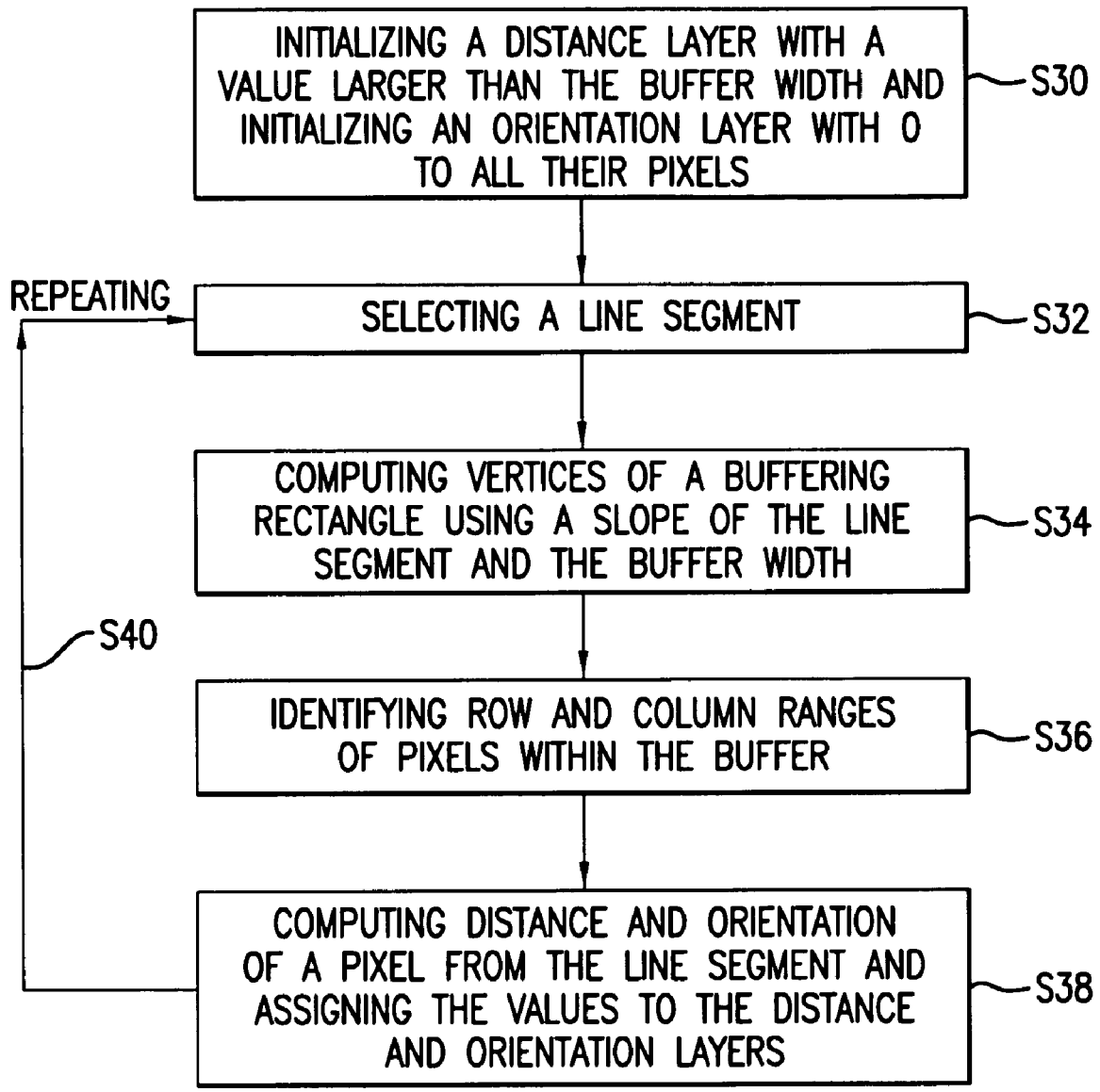
FIG. 14 depicts a process of buffering, according to an embodiment of the present invention.

The buffering process 66 (in FIG. 11) generates two raster layers, a distance layer and an orientation layer. FIG. 14 depicts a process of buffering, according to an embodiment of the present invention. The buffering process includes initializing a distance layer with a value larger than the buffer width and initializing an orientation layer with 0 to all their pixels, at S30. The buffering process also includes selecting a line segment from a line dataset, at S32, and computing vertices of a buffering rectangle using a slope of the line segment and the buffer width inputted by a user, at S34. The buffering process progresses by identifying row and column ranges of pixels within the buffer, at S36, and computing distance and orientation of the pixels from the line segment and assigning the computed values to the distance and orientation layers, at S38. In an embodiment of the invention, the buffering process includes selecting the next line segment in the input dataset and repeating the computing of the vertices, repeating the identifying of the row and column ranges and repeating the computing of the distance and orientation of the pixels and repeating the assigning of the computed values to the distance and orientation layers, as shown by the arrow at S40. The repeating loop may be run until the end of the data set.

Figure 15:
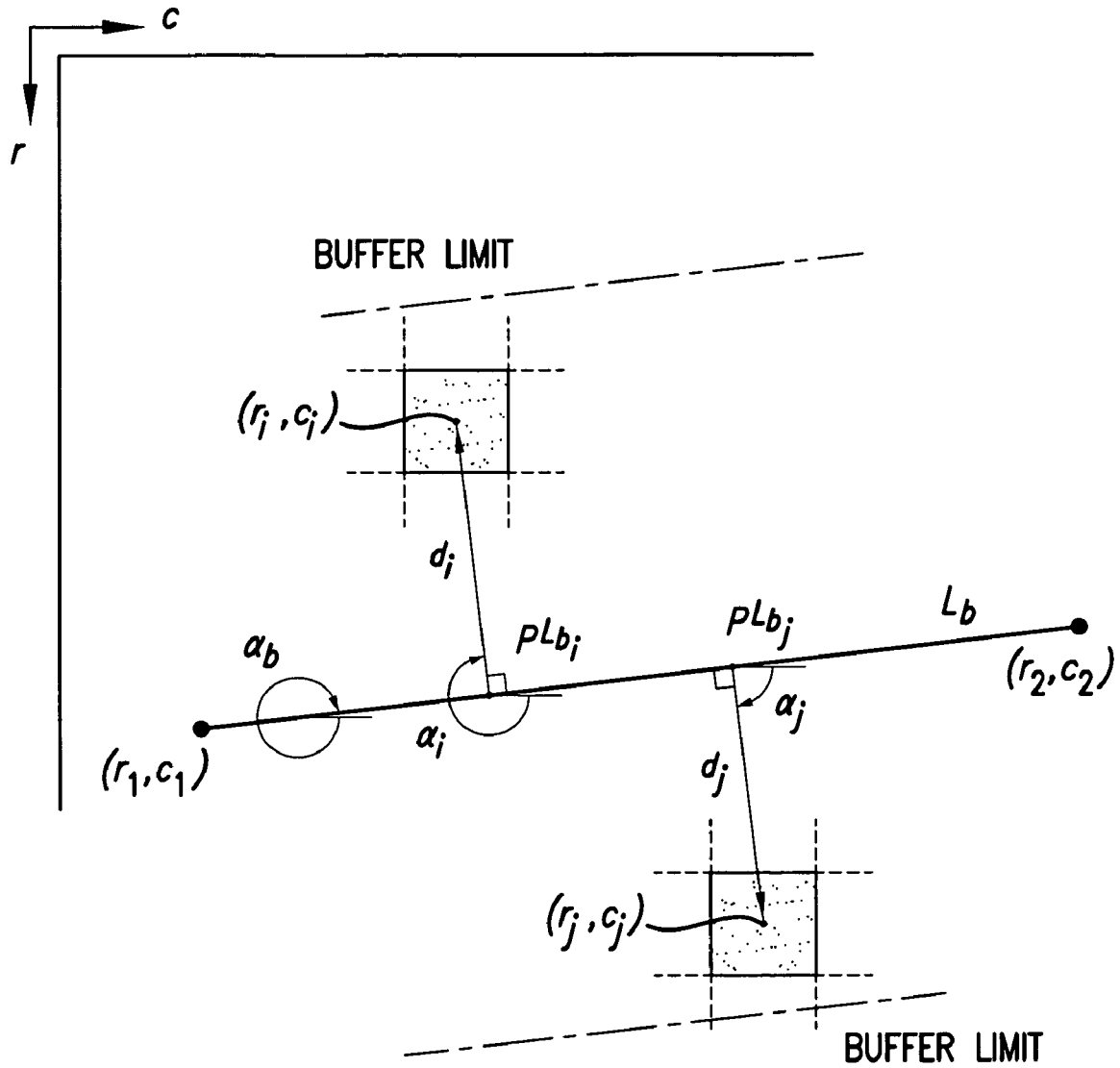
FIG. 15 shows variables used for computing a distance and an orientation at a buffering pixel, according to an embodiment of the present invention.

FIG. 15 shows variables used for computing the distance and orientation at a buffering pixel, according to an embodiment of the present invention. The variables $d_l$ and $\alpha_l$ denote the distance and orientation of the center of the pixel $(r_l, c_l)$ from its closest point $P^{L_b}_l$ on the buffering line $L_b$, respectively.

Hence, using the distance formula from a point to a line, the distance $d_l$ is computed as follows:

$$I_d(r_i, c_i) = d(r_i, c_i) = \frac{|\Delta r(c_i - c_1) - \Delta c(r_i - r_1)|}{\sqrt{\Delta r^2 + \Delta c^2}} \quad (11)$$

Furthermore, the orientation $\alpha_l$ can also be computed using the slope angle $\alpha_b$ of line $L_b$ as follows:

$$I_\alpha(r_i, c_i) = \alpha_i = \begin{cases} \alpha_b + \frac{\pi}{2} & \text{if } \Delta r(c_i - c_1) - \Delta c(r_i - r_1) < 0 \\ \alpha_b - \frac{\pi}{2} & \text{otherwise.} \end{cases} \quad (12)$$

Thus, the angle of the pixel $(r_j, c_j)$ in the opposite side of the pixel $(r_l, c_l)$ can be expressed as follows:

$$I_\alpha(r_j, c_j) = \alpha_j = I_\alpha(r_b, c_l) \pm \pi = \alpha_l \pm \pi \quad (13)$$

Figure 16:
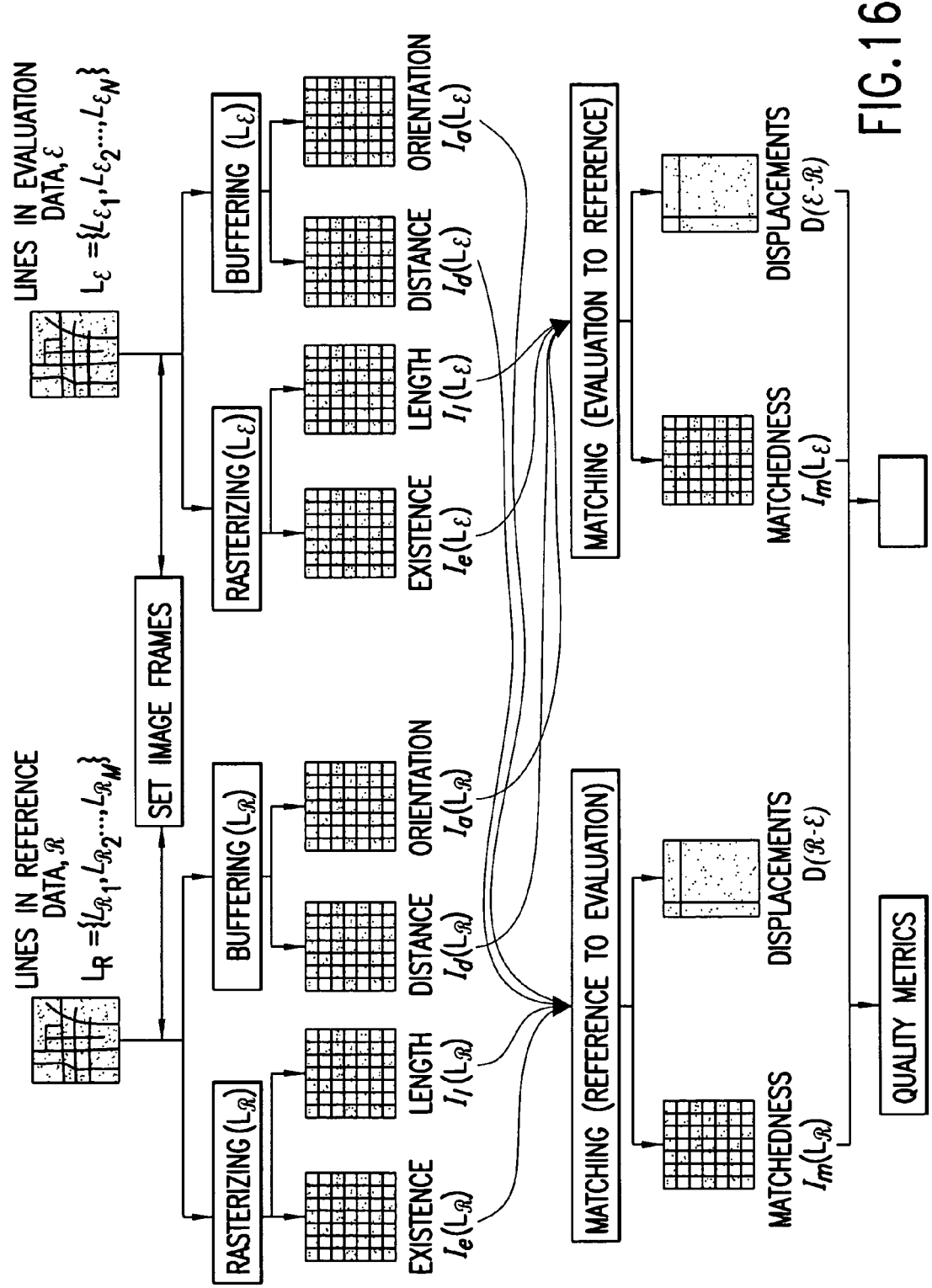
FIG. 16 is a flow diagram of an overall procedure for assessing linear correspondence using a raster-based reference for vector matching method, according to an embodiment of the present invention.

FIG. 16 is a flow diagram of the overall procedure for assessing linear correspondence using the RBRVM method, according to an embodiment of the present invention. Initially, the procedure starts by setting an image frame so that the image frame is configured by the map extent of the overlapping area of the input data sets $L_E$ (evaluation data set) and $L_R$ (reference data set), by the image cell size, and by the x, y offsets of the evaluation dataset $L_E$. The configuration of the image frame makes mutual referencing of the coordinates between ground image and established image. Then, the procedure proceeds by generating four raster layers, i.e., existence layer $I_e$, length layer $I_l$, distance layer $I_d$ and orientation layer $I_a$, from each dataset using rasterizing and buffering processes discussed in the above paragraphs.

With the raster layers generated, the procedure continues by performing matching in two directions, one direction being from reference to evaluation and the other direction being from evaluation to reference. The matching process in the direction evaluation to reference exploits two layers (existence layer and length layer) from the evaluation dataset. The matching process in the direction evaluation to reference also uses two other layers (distance layer and orientation layer) from reference data.

The overall procedure includes evaluating the existence layer to find a pixel with value 1 (pixel with line). If the value of the pixel is 1 (positive), the procedure continues by checking the value of the distance buffer layer at the pixel. If the value of the pixel is zero (negative), the procedure continues by repeating the evaluating of the existence layer for all pixels until a value of the pixel is 1.

If the value of the distance buffer is equal to or less than the buffer width and the angle difference between two retrieved line segments is less than the angular threshold, then the pixel is considered as a valid pixel for matching further. Otherwise, the procedure goes to repeating the evaluating of the existence layer.

If a valid pixel is found, the procedure proceeds by computing: corresponding points of the valid pixel on vector lines, displacement of the corresponding points of the valid pixel, and measuring the corresponding length at the valid pixel using the length, distance, and orientation from the layers.

The procedure further includes repeating the evaluating of the existence layer, repeating the checking of the value of the distance buffer layer, and repeating computing corresponding points of the valid pixel on vector lines, displacement of the corresponding points of the valid pixel and repeating the measuring of the corresponding length at the pixel until an end of the pixels is reached.

In one embodiment, the procedure may further include, after collecting the matching lengths, assessing the quality of evaluation data by employing metrics, including completeness, correctness, quality and redundancy. In another embodiment, the procedure may further include quantifying, in a form of RMS, circular error, etc., geometric accuracy of the matched lengths and estimating average displacements in the X and Y directions.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the methods and systems of the present invention, like related systems and methods used in the imaging arts are complex in nature, are often best practiced by empirically determining the appropriate values of the operating parameters, or by conducting computer simulations to arrive at best design for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A feature evaluation system, comprising:
   an evaluation system configured to consider extracted features that comprise at least one input test vector data set and reference features that comprise at least one reference vector data set;
   wherein said evaluation system is configured to quantify accuracy through characterizing X and Y offsets and to quantify quality and correspondence through two-way matching and computing correspondence-based performance metrics between the reference features and the extracted features; and
   wherein the evaluation system is a computer-based device.

2. The system of claim 1, wherein the feature evaluation system comprises an accuracy analysis unit, a correspondence analysis unit, and a performance metrics evaluation unit.

3. The system of claim 2, wherein the correspondence analysis unit comprises:
   a converting component for converting input vectors of the reference features and input vectors of the extracted features into raster linear data with a certain pixel size;
   a buffering component for buffering the raster linear data by dilating the raster linear data with a specified buffer size for creating buffer images; and
   an overlay analysis component for finding matching features by intersecting the buffer images with the raster linear data.

4. The system of claim 2, wherein the correspondence analysis unit is configured to establish a correspondence from reference features to extracted features by using a reference image and a buffered image of the extracted features to obtain a correspondence result.

5. The system of claim 4, wherein the correspondence analysis unit is further configured to establish a correspondence from extracted features to reference features by using an extracted image and a buffered image of reference features.

6. The system of claim 4, wherein the performance metrics evaluation unit is configured to apply a metric on the correspondence result.

7. The system of claim 6, wherein the metric is selected from the group consisting of a completeness metric, a correctness metric, a quality metric, a redundancy metric, a distance statistics metric, a gap statistics metric, and a combination of two or more thereof.

8. The system of claim 7, wherein the completeness metric represents a comparison of an amount of reference data that corresponds to extracted features to a total amount of reference data.

9. The system of claim 7, wherein the correctness metric represents a comparison of an amount of the extracted features which correspond to reference features to a total amount of extracted features.

10. The system of claim 7, wherein the quality metric represents a comparison of extracted features that match a reference feature to a sum of a total amount of extracted features and a total amount of unmatched reference features.

11. The system of claim 7, wherein the redundancy metric represents an amount of extracted features which correspond to a same reference feature.

12. The system of claim 7, wherein the distance statistics metric comprises computing geometric accuracy of the extracted features by measuring the distance from corresponding reference features.

13. A method for evaluating features comprising using a computer-based device to perform the steps of:
    evaluating extracted features that comprise at least one input test vector data set; and
    quantifying accuracy through characterizing X and Y offsets and quantifying quality and correspondence through two-way matching and computing correspondence-based performance metrics between predefined reference features and the extracted features.

14. The method of claim 13, wherein quantifying correspondence between predefined reference features and the extracted features comprises:
    converting input vectors of the predefined reference features and input vectors of the extracted features into raster linear datasets of a specified common pixel size established for enabling feature matching, accuracy assessment, feature differentiation, and computational efficiency;
    buffering the raster linear datasets by dilating the raster linear dataset features to a specified common buffer limit; and
    assessing the quality and correspondence of the extracted features through two-way matching comprising checking the extracted features within a distance from the predefined reference features and checking the predefined reference features within a distance from the extracted features.

15. The method of claim 13, wherein quantifying quality and correspondence between predefined reference features and the extracted features comprises first evaluating each pixel on the path of at least one raster linear segment of the raster linear datasets as a candidate pixel for matching, thereby establishing at least one evaluation pixel.

16. The method of claim 13, further comprising computing performance metrics based on statistics from the correspondence.

17. The method of claim 16, wherein the computing of the performance metrics comprises applying a metric on a result of the correspondence.

18. The method of claim 17, wherein the metric is selected from the group consisting of a completeness metric, a correctness metric, a quality metric, a redundancy metric, a distance statistics metric, a gap statistics metric, and a combination of two or more thereof.

19. The method of claim 18, wherein the completeness metric represents a comparison of an amount of reference features that correspond to extracted features to a total amount of reference features.

20. The method of claim 18, wherein the correctness metric represents a comparison of an amount of extracted features that correspond to reference features to a total amount of extracted features.

21. The method of claim 18, wherein the quality metric represents a comparison of extracted features that match reference features to a sum of a total amount of extracted features and a total amount of unmatched reference features.

22. The method of claim 18, wherein the redundancy metric represents an amount of extracted features which corresponds to the same reference features.

23. The method of claim 18, wherein the distance statistics metric comprises computing geometric accuracy of extracted features by measuring the distance from corresponding reference features.

24. A method of rasterizing and buffering comprising using a computer-based device to perform the steps of:
assigning a first value to all pixels in an existence layer in which an extracted vector line is present, the first value being different from a second value assigned to all pixels in which no extracted vector line is present;
assigning a length of the extracted vector line to all pixels in a length layer that correspond to pixels in the existence layer having the first value;
generating a buffer area around a reference vector line associated with the extracted vector line;
computing a distance from a center of each pixel in the buffer area to a nearest point on the reference vector line and storing the distance in a respective pixel of a distance layer; and
computing an orientation of the reference vector line for each pixel in the buffer area and storing the orientation in a respective pixel of an orientation layer.

25. The method of claim 24, further comprising:
computing ranges of the extracted vector line in row and column to obtain a row range and a column range for the extracted vector line for each pixel where the extracted vector line is present,
wherein the length of the extracted vector line is a maximum of the row range and the column range.

26. The method of claim 24, further comprising:
selecting another vector line in a line dataset and repeating:
the assigning of the first value to all pixels in the existence layer in which an extracted vector line is present, the first value being different from a second value assigned to all pixels in which no extracted vector line is present;
the assigning of a length of the extracted vector line to all pixels in a length layer that correspond to pixels in the existence layer having the first value;
the generating of a buffer area around a reference vector line associated with the extracted vector line;
the computing of a distance from a center of each pixel in the buffer area to a nearest point on the reference vector line and storing the distance in a respective pixel of a distance layer; and
the computing of an orientation of the reference vector line for each pixel in the buffer area and storing the orientation in a respective pixel of an orientation layer.

27. A method of assessing linear correspondence comprising using a computer-based device to perform the steps of:
setting an image frame for establishing coordinates for the extent of the area of interest as defined by the extent of the overlapping area of an input evaluation dataset and an input reference dataset, by a cell size of the image, and by offsets of the evaluation dataset;
generating a set of raster data layers comprising an existence layer, a length layer, a distance layer, and an orientation layer from each input evaluation and input reference dataset for matching extracted features and reference features and assessing the accuracy, quality, and correspondence of the extracted features and reference features; and
performing matching in two directions, one matching direction being from extracted features within a distance from reference features and the other matching direction being from reference features within a distance from extracted features;
wherein the matching in the matching direction from extracted features within a distance from reference features quantifies the portion of the evaluation feature dataset that is incorrect and the matching in the matching direction from reference features within a distance from extracted features quantifies the portion of the reference feature dataset that is not matched.

28. The method of claim 27, further comprising:
evaluating the existence layer to find a pixel with the first value;
checking a value of the distance buffer layer at the pixel, if the value of the pixel is equal to the first value;
repeating the evaluating of the existence layer for all pixels until a value of the pixel is equal to the first value;
validating the pixel, if a value of the distance buffer is equal to or less than a buffer width and an angle difference between two retrieved line segments is less than an angular threshold; and
repeating the evaluating of the existence layer for all pixels until a valid pixel is found, if a value of the distance buffer is not equal to or greater than a buffer width, and an angle difference between two retrieved line segments is not less than an angular threshold.

29. The method of claim 27, further comprising, when a valid pixel is found:
computing corresponding points of the valid pixel on vector lines;
computing displacement of the corresponding points of the valid pixel; and
measuring the corresponding length at the valid pixel using the length, distance, and orientation from the length, distance, and orientation layers.

30. The method of claim 29, further comprising repeating evaluating the existence layer, repeating the checking of the value of the distance buffer layer, repeating computing corresponding points of the valid pixel on vector lines, repeating computing of the displacement of the corresponding points of the valid pixel, and repeating the measuring of the corresponding length at the valid pixel until an end of the pixels is reached.

31. The method of claim 27, further comprising assessing a quality of evaluation data by employing metrics.

32. The method of claim 31, wherein the metrics are selected from the group consisting of completeness, correctness, quality, redundancy, and any combination of two or more thereof.

33. The method of claim 27, further comprising quantifying geometric accuracy of matched lengths and estimating average displacement in a plurality of directions.

34. The system of claim 1, wherein the extracted features are extracted data from imagery, existing maps, GIS, GPS, or combinations thereof.

35. The system of claim 1, wherein the reference features are reference data from which accuracy, quality, and correspondence performance metrics are quantified.

36. The system of claim 2, wherein the accuracy analysis unit compares extracted features comprising the at least one input test vector data set to reference features comprising the at least one reference vector data set.

37. The system of claim 2, wherein the evaluation system collects horizontal offsets between the at least one test vector data set and the at least one reference vector data set and calculates accuracy of the at least one test vector data set relative to the at least one reference vector data set.

38. The method of claim 14, wherein the checking the extracted features within a distance from the predefined reference features comprises quantifying the portion of the at least one input test vector data set that is incorrect.

39. The method of claim 14, wherein the checking the predefined reference features within a distance from the extracted features comprises quantifying the portion of the predefined reference features that is missing.

40. The method of claim 15, wherein the evaluating of each pixel comprises systematically establishing valid matches between pixels in the extracted features and pixels in the reference features.

41. The method of claim 40, wherein the establishing valid matches between pixels further comprises evaluating the pixel distance for a specified buffer limit at the evaluation pixel, the angular alignment difference between at least two raster linear segments, and the matching distance between pixels.

42. The method of claim 41, wherein the evaluating the angular alignment difference comprises comparing the angular difference values at the evaluation pixel.

* * * * *